(12) United States Patent
Cheskin et al.

(10) Patent No.: US 12,144,782 B2
(45) Date of Patent: Nov. 19, 2024

(54) PILL CUTTERS AND METHODS OF USE

(71) Applicant: SPLITRX LLC, Los Gatos, CA (US)

(72) Inventors: Barry Cheskin, Los Gatos, CA (US); Terah Whiting Smiley, Davis, CA (US)

(73) Assignee: SPLITRX LLC, Los Gatos, CA (US)

( * ) Notice: Subject to any disclaimer, the term of this patent is extended or adjusted under 35 U.S.C. 154(b) by 0 days.

(21) Appl. No.: 17/816,342

(22) Filed: Jul. 29, 2022

(65) Prior Publication Data

US 2023/0009753 A1 Jan. 12, 2023

Related U.S. Application Data

(63) Continuation of application No. 17/359,381, filed on Jun. 25, 2021, now Pat. No. 11,432,998.

(60) Provisional application No. 63/141,755, filed on Jan. 26, 2021, provisional application No. 63/045,003, filed on Jun. 26, 2020.

(51) Int. Cl.
| | |
|---|---|
| A61J 7/00 | (2006.01) |
| B26B 17/00 | (2006.01) |
| B26D 7/00 | (2006.01) |
| B26D 7/01 | (2006.01) |
| F16P 3/10 | (2006.01) |

(52) U.S. Cl.
CPC .............. *A61J 7/0007* (2013.01); *B26B 17/00* (2013.01); *B26D 7/00* (2013.01); *B26D 7/01* (2013.01); *F16P 3/10* (2013.01)

(58) Field of Classification Search
CPC .......... A61J 7/0007; B26B 17/00; B26D 7/01; B26D 3/30; B26D 7/00; B26D 5/10
See application file for complete search history.

(56) References Cited

U.S. PATENT DOCUMENTS

| | | | |
|---|---|---|---|
| 4,637,288 A | 1/1987 | Olsen et al. | |
| 5,118,021 A | 6/1992 | Fiocchi | |
| 5,184,534 A | 2/1993 | Lee | |
| 6,543,323 B2 | 4/2003 | Hayashizaki et al. | |
| 7,243,826 B2 | 7/2007 | Darst | |
| 7,275,671 B1 | 10/2007 | Reitano | |
| 7,543,770 B2 | 6/2009 | Peron et al. | |
| 7,673,778 B2 * | 3/2010 | Sze | B26D 7/22 225/104 |
| 7,828,181 B1 | 11/2010 | Reitano | |
| 8,550,319 B2 | 10/2013 | Raghuprasad | |
| 8,590,164 B2 | 11/2013 | Noble et al. | |
| 8,720,808 B2 | 5/2014 | Young et al. | |
| 8,925,434 B2 | 1/2015 | Omura et al. | |
| 9,299,211 B2 | 3/2016 | Yuyama et al. | |
| 9,314,405 B2 | 4/2016 | Smith | |
| 9,827,165 B1 * | 11/2017 | Sundt | A61J 7/0007 |
| 9,861,556 B2 | 1/2018 | Omura et al. | |
| 9,878,460 B2 | 1/2018 | Omura | |

(Continued)

FOREIGN PATENT DOCUMENTS

| | | |
|---|---|---|
| CN | 110653861 A | 1/2020 |
| JP | 2017074176 A | 4/2017 |

*Primary Examiner* — Jonathan G Riley

(74) *Attorney, Agent, or Firm* — Shay Glenn LLP; Thomas M. Zlogar

(57) ABSTRACT

Pill cutters and methods of cutting pills. The pill cutters may optionally include a spinnable blade and may be configured to cause the blade to spin to cut a pill. The pill cutters may be adapted to adjust the position of the pill before cutting the pill.

14 Claims, 12 Drawing Sheets

(56) References Cited

U.S. PATENT DOCUMENTS

| | | |
|---|---|---|
| 9,919,542 B2 | 3/2018 | Kano et al. |
| 10,010,484 B2 | 7/2018 | Muller et al. |
| 10,123,943 B2 | 11/2018 | Patil et al. |
| 10,245,215 B2 | 4/2019 | Triplett |
| 10,278,899 B2 | 5/2019 | Wang |
| 10,398,628 B2 | 9/2019 | Raghuprasad |
| 10,420,706 B2 | 9/2019 | Lee |
| 10,500,749 B2 | 12/2019 | Lin |
| 10,772,802 B2 | 9/2020 | Radohl et al. |
| 10,772,803 B2 | 9/2020 | Omura |
| 2002/0059854 A1 | 5/2002 | Gass et al. |
| 2003/0084574 A1* | 5/2003 | Eric .............. A61J 7/0007 225/103 |
| 2010/0162867 A1 | 7/2010 | McCracken et al. |
| 2012/0060374 A1* | 3/2012 | Noble ............. A61J 7/0007 30/124 |
| 2014/0174271 A1* | 6/2014 | Omura ............. B26D 5/086 83/361 |
| 2015/0164747 A1* | 6/2015 | Li .................. A61J 7/0007 30/124 |
| 2016/0051448 A1* | 2/2016 | Ferraro ........... A61J 7/0007 83/467.1 |
| 2016/0367441 A1 | 12/2016 | Martin |
| 2017/0309971 A1 | 10/2017 | Zhang et al. |
| 2019/0105232 A1* | 4/2019 | Fallah ............ A61J 7/0007 |
| 2019/0350813 A1 | 11/2019 | Omura |
| 2020/0060935 A1 | 2/2020 | Alshear |
| 2020/0297583 A1 | 9/2020 | Dang et al. |
| 2021/0401671 A1 | 12/2021 | Cheskin et al. |
| 2022/0000719 A1* | 1/2022 | Lee ............... A61J 7/0007 |

\* cited by examiner

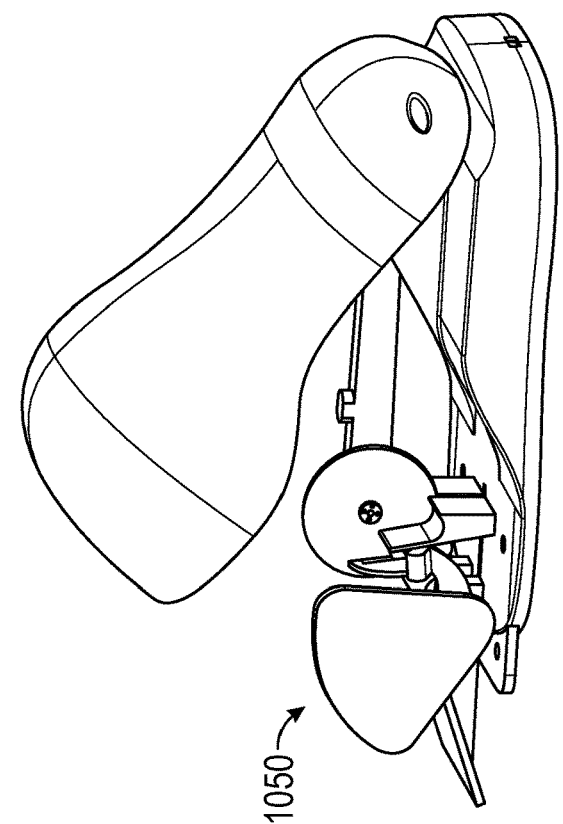
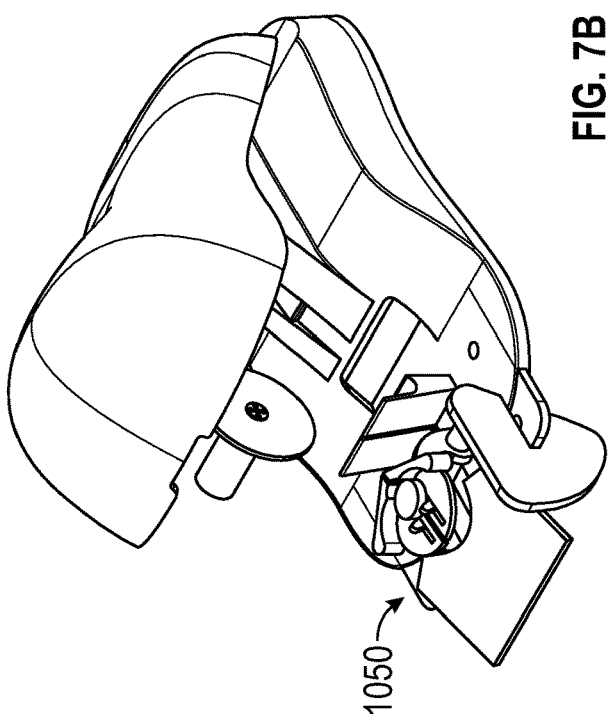
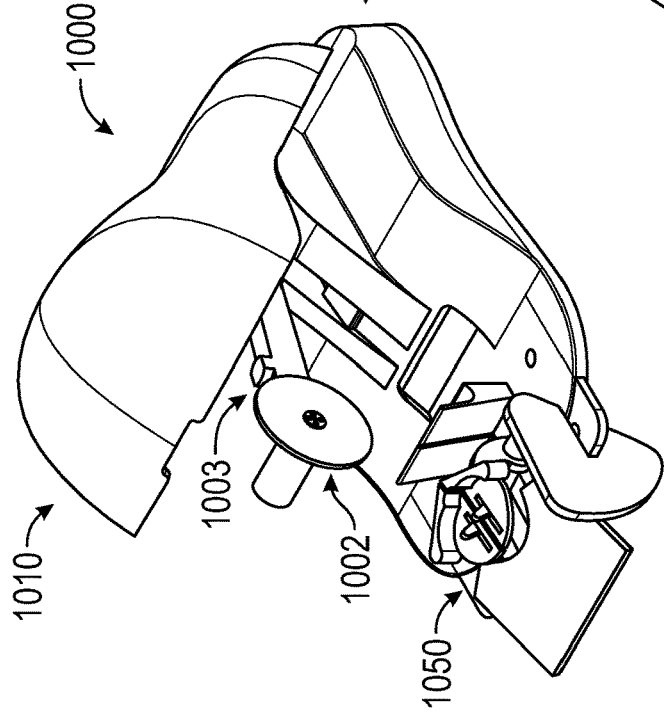
FIG. 7A
FIG. 7B
FIG. 7C

PILL CUTTERS AND METHODS OF USE

CROSS REFERENCE TO RELATED APPLICATIONS

This application is a continuation of U.S. application Ser. No. 17/359,381, filed Jun. 25, 2021, now U.S. Pat. No. 11,432,998, which claims the benefit of the following U.S. applications, the disclosures of which are fully incorporated by reference herein for all purposes: U.S. Provisional Application No. 63/045,003, filed Jun. 26, 2020; and U.S. Provisional Application No. 63/141,755, filed Jan. 26, 2021.

INCORPORATION BY REFERENCE

All publications and patent applications mentioned in this specification are herein incorporated by reference to the same extent as if each individual publication or patent application was specifically and individually indicated to be incorporated by reference.

BACKGROUND

Around 1 in 6 Americans use a pill splitter to split their pills, and the proportion is likely higher for patients with multiple chronic diseases who often require multiple pills. They typically split their pills for one or more of the following reasons: get the right dosage, reduce the size of the pill because the pill is too big to safely or comfortably swallow, or to save money.

Current pill splitters come in multiple configurations, but generally they use a sharp blade or cutter configured in a holder with a handle that is pressed down to fracture the pill. They generally include a top or cover portion that includes a fixed blade, and a bottom pill receiving portion that can receive the pill that is to be cut. The top portion may be hinged with the bottom portion, so that the top portion can be lifted to allow access to the pill receiving area in the bottom portion. After the pill is positioned in the bottom pill receiving area, the top portion, including the fixed blade, is pressed down until the blade engages and cuts through the pill. Merely exemplary pill splitters are described in U.S. Pat. Nos. 7,828,181 and 8,590,164, the disclosures of which are incorporated by reference herein. Traditional pill splitters typically have a V-shaped bed to accept and hold the pill.

There are multiple problems with current pill splitters. First, they often result in pills being split unevenly, with around 15% of split pill halves falling outside the proxy USP specification range in a controlled study. There are suggestions that in the real world the variation may be higher. For example, a survey conducted showed 65% of pill splitter users felt their pills were split unevenly by their current pill splitter, based on visual inspection. Depending on the specific drug being split, uneven splitting could lead to significant issues of safety and efficacy, decreasing the quality of life. Second, they are hard to use, with nearly half of all respondents in a survey reporting difficulty in using them. For example, they are hard to press or it is difficult to position the pills in the splitter. Patients' dissatisfaction with pill splitters could lead to poor medication compliance on their own and an increasing reliance on others.

Additionally, depending on the pill and/or the particular pill splitter, it may be difficult to position a pill in the pill area such that the blade cuts the pill along an intended cut or split line. This may be at least partly based on the pill, including one or both of the pill size and shape. For example, some pills have non-circular shapes (e.g., triangular) for which it may be difficult to properly position and/or stabilize the pill in the pill splitter, such as in a generally "V" shaped pill area or region. It may be desirable to have more control of the positioning or adjustment of the pill in the cutting area of the splitter.

Additionally, traditional pill splitters are generally designed to split a pill into two pieces (e.g., halves). In some instances, it may be desirable to more easily split a pill into more than two pieces, such as three or more pieces (such as thirds, or quarters, for example, if the desired pieces have the same size). To cut a pill into more than two pieces, it may be desirable to have more control over the positioning or adjustment of the pill relative to the blade plane, which is generally the plane the blade is in during the cutting process.

Effective and reliable handheld pill cutters are needed to overcome one or more of the deficiencies set forth above.

SUMMARY OF THE DISCLOSURE

One aspect of the disclosure includes pill cutters that include a spinnable blade, wherein the pill cutters are configured to cut a pill with the spinning blade.

In this aspect, the pill cutters may include a base portion that includes a pill receiving area that is sized and configured to receive a pill and a bladed portion that includes a blade that is adapted to spin. The bladed portion may be movably coupled to the base portion and movable relative to the base portion to allow access to the pill receiving area to position a pill in the pill receiving area.

In this aspect, the pill cutters may include one or more energy communication elements, which may include a motor, that are configured to operably communicate energy to the blade and cause the blade to spin relative to the bladed portion.

In this aspect, the blade may be arranged and disposed relative to the pill receiving area such that when the bladed portion is moved towards the base portion and when the blade is spinning, the blade cuts through a pill that is secured in the pill receiving area.

In this aspect, the pill cutters may also be adapted to prevent the blade from spinning in certain situations. The pill cutters may include a spin preventing mechanism that is configured to prevent the pill cutter from causing the blade to spin. Blade spin preventing mechanisms may be adapted to prevent the pill cutter from spinning the blade if the bladed portion is in a first position relative to the base portion. Blade spin preventing mechanisms may be adapted to prevent the pill cutter from spinning the blade if the bladed portion is in a fully open position relative to the base portion. Blade spin preventing mechanisms may be adapted to prevent the pill cutter from spinning the blade if the bladed portion is not in a closed (or not sufficiently closed) position relative to the base portion. Blade spin preventing mechanisms may further be adapted to prevent the pill cutter from spinning the blade if one or both of the blade or a blade arm is not displaced from a neutral or at-rest position within the bladed portion. Blade spin preventing mechanisms may include a motor that is in operable communication with the blade, and wherein the blade spin preventing mechanism is adapted to prevent the motor from being activated when one or both of the bladed portion is not in a closed configuration, or the blade and/or a blade arm coupled to the blade are not displaced from a neutral position within the bladed portion. Blade spin preventing mechanisms may include one or more sensors and/or one or more switches that facilitate control of when the motor can be activated and when it cannot be activated. Blade spin preventing mechanisms may be further adapted to slow or stop the blade after it has begun to spin, such as if the pill is cut or a cover is lifted.

In this aspect, the pill cutter may be adapted to cause the spinning blade to slow or stop if the bladed portion is moved from a closed position towards or to an open position.

In this aspect, the pill cutters may be further adapted to cause the spinning blade to slow or stop when the blade has cut through the pill.

In this aspect, the pill cutter may be further adapted to cause the spinning blade to slow or stop when one or both of the blade or a blade arm returns from a displaced configuration to a neutral position within the bladed portion that indicates the pill has been cut. The pill cutters may further comprise a spring or spring-like element that is positioned and arranged to be compressed as the bladed portion is moved towards a closed position relative to the base portion, and where the spring is adapted to cause one or both of the blade or the blade arm to move towards the neutral position as the blade spins and cuts the pill, wherein the movement towards the neutral position causes the blade to cut through the pill. In this example, a spring may be coupled to the cover portion of the bladed portion and to a blade arm, for example, such that when compressed it will apply a force on the blade arm to push the blade arm downward through the pill.

In this aspect, the pill cutter may further comprise a spring that is positioned and arranged to be compressed as the bladed portion is moved towards a closed position relative to the base portion, and where the spring is adapted to cause one or both of the blade or the blade arm to move towards a neutral position as the blade spins and cuts the pill, wherein the movement towards the neutral position causes the blade to cut through the pill.

In this aspect, one or more energy communication elements may include a motor in operable communication with the blade such that motor activation causes the blade to spin. A motor may be part of the bladed portion.

In this aspect, the bladed portion and/or the pill cutter in general may have a width from 2 cm to 20 cm, such as from 5 cm to 15 cm, such as 10 cm, or about 10 cm.

In this aspect, the pill cutter may further comprise an energy source receiving area disposed in the base portion, the energy source receiving area sized and configured to receive a removable energy source therein. Energy source receiving areas may be disposed behind the pill receiving area of the pill cutter (closer to the back of the pill cutter).

In this aspect, the blade may be in rotational communication with a motor shaft of a motor.

In this aspect, a motor may be in electrical communication with an energy source receiving area, wherein the energy source receiving area may be configured and dimensioned to receive a battery therein.

In this aspect, one of the bladed portion or the base portion may include a battery receiving area sized and configured to stably receive a removable battery therein. A battery receiving area may be sized and configured to stably receive therein one of a cylindrical battery, a rectangular battery, or a coin-shaped battery, for example. Battery receiving areas may optionally not overlap with a blade path or a blade plane of the blade in a top-down view of the handheld pill cutter, when the bladed portion is in a closed position relative to the base portion.

In this aspect, the pill cutters may have a width from 2 cm to 20 cm.

In this aspect, a base portion and a bladed portion may have a hinged relationship at an end region of the pill cutter to facilitate opening and closing of the bladed portion relative to the base portion.

In this aspect, the pill cutter may further comprise one or more pill securing members disposed to be movable by a user relative to the pill receiving area to secure a pill between at least first and second surfaces when the pill is placed in the pill receiving area, and a pill adjustment actuator operably coupled to a pill adjustment member, the pill adjustment member movable relative to the pill receiving area upon user actuation of the pill adjustment actuator to facilitate at least some lateral movement of the secured pill relative to a blade plane.

In this aspect, the pill cutter may be adapted to cut pills when oriented non-horizontally relative to a surface on which the pill is placed. The pill cutter may be sized and configured to maintain a pill in a non-horizontal position relative to the surface in which a pill height relative to a base portion surface on which the pill is disposed is greater than a height of the pill if either a top or bottom surface of the pill were placed on the surface or other horizontal surface.

One aspect of this disclosure is related to pill cutters that are adapted to move a pill laterally to some extent in the pill receiving area. The term laterally as used herein does not require solely lateral movement, but rather laterally as used herein also includes movement that includes some lateral movement and some degree of back or forth movement. Lateral movement refers to the x direction in a coordinate system (+/−), and front/back pill movement refers to the y direction in the coordinate system (+/−), which is shown in FIG. 6B and can be applied to all pill cutters herein regardless of the particular example or embodiment.

In this aspect, the pill cutter may include one or more pill securing members disposed such that they may be movable by a user relative to the pill receiving area to secure a pill between at least first and second surfaces when the pill is placed in the pill receiving area, and a pill adjustment actuator operably coupled to a pill adjustment member, the pill adjustment member movable relative to the pill receiving area upon user actuation of the pill adjustment actuator to facilitate lateral movement of the secured pill relative to a blade plane.

In this aspect, a pill adjustment member may be adapted to be moved relative to the pill receiving area upon user actuation of the pill adjustment actuator to cause rotation of the secured pill.

In this aspect, the pill adjustment member may be adapted to be moved relative to the pill receiving area upon user actuation of the pill adjustment actuator to cause solely lateral movement of the pill relative to the blade plane (i.e., no +/−y direction movement, see FIG. 6B).

In this aspect, the lateral movement of the secured pill includes some axial pill movement (i.e., some +/−y direction movement).

In this aspect, the pill adjustment actuator may extend from a front region of the pill cutter and away from the pill receiving area.

In this aspect, the pill adjustment actuator may extend from a side of the pill cutter and away from the pill receiving area.

In this aspect, the pill adjustment member may be adapted and arranged to pivot about a rotational axis relative to a base surface of the base portion.

In this aspect, the pill securing member and pill adjustment member may together be adapted and arranged such that user actuation of the pill adjustment actuator may cause simultaneous rotation and lateral movement of the secured pill.

In this aspect, a first pill securing member may be arranged to be axially (front/back movement) moved by the user to cause axial movement of the pill and thereby secure the pill in the pill receiving area. A first pill securing member may be arranged relative to the pill adjustment member to slide axially relative to a portion of the pill adjustment member and thereby secure the pill.

In this aspect, a pill adjustment member may be arranged to be moved solely laterally in response to user actuation of the pill adjustment actuator. A pill adjustment member may be arranged to be further moved rotationally in response to user actuation of the pill adjustment actuator.

In this aspect a pill adjustment member may be arranged to be moved solely rotationally in response to user actuation of the pill adjustment actuator. A pill adjustment member may be arranged to be further moved laterally in response to user actuation of the pill adjustment actuator.

In this aspect, a pill adjustment member may comprise a rotationally and laterally movable pill stage dimensioned to receive a pill thereon.

In this aspect, a pill adjustment member may be adapted to be detachable from the base portion and are adapted to be reattached to the base portion for subsequent pill cutting. A pill adjustment member may be magnetically detachable and re-attachable.

In this aspect, a blade may be removable from the bladed portion and replaceable with a different blade.

One aspect of the disclosure includes pill cutters that include a pill adjustment actuator that is operably coupled to a pill adjustment member, the pill adjustment member movable relative to the pill receiving area upon user actuation of the pill adjustment actuator to move the secured pill along a path that does not follow a blade plane of the blade. Any optional disclosure related to the previous aspect above may also be included in this aspect of the disclosure.

One aspect of the disclosure includes pill cutters that include a pill adjustment actuator operably coupled to a pill adjustment member, the pill adjustment member movable relative to the pill receiving area upon user actuation of the pill adjustment actuator to allow more than 50% of a secured circular pill to be situated on a first side of a blade plane before the pill is cut. Any optional disclosure related to the previous two aspects above may also be included in this aspect. In this aspect, the position of the pill may be adjusted such that it may be intentionally cut into pieces that are not equal sizes.

One aspect of the disclosure is a method of cutting a pill with a pill cutter, comprising moving a bladed portion of the pill cutter toward a base portion of the pill cutter, the bladed portion including a blade and the base portion having a pill secured and disposed in a pill receiving area; causing the blade to spin relative to the bladed portion; and cutting the pill while the blade is spinning relative to the bladed portion.

One aspect of this disclosure is a method of cutting a pill with a pill cutter, wherein the method includes maintaining a pill in a cutting position in a pill receiving area of the pill cutter so that when a blade cuts through the pill, a linear length of the cut is less than a height of the cut through the pill.

One aspect of this disclosure is a method of cutting a pill with a pill cutter, wherein the method comprises: maintaining a pill in a non-horizontal position relative to a surface on which it is placed in which a pill height relative to the surface on which the pill is disposed is greater than a height of the pill if either a top or bottom surface of the pill were placed on the surface.

One aspect of the disclosure is a method of cutting a pill with a pill cutter, wherein the method includes: cutting through a pill such that the blade contacts a side of the pill before it contacts a top or a bottom of the pill, where the side has a height dimension less a greatest linear distance across the top of the pill and less than a greatest linear distance across the bottom of the pill.

One aspect of the disclosure is a method of loading a pill into a pill cutter, the method including: positioning a pill on a pill receiving surface of a base portion of the pill cutter in a first position relative to the surface; and rotating the pill to a second position that is more vertical than the first position; and maintaining the pill secured in the second position. The method may further include cutting the pill with a blade of the pill cutter, such as with a spinning blade.

One aspect of the disclosure is a pill cutter with a pill securing and moving assembly, the pill securing and moving assembly including a pill receiving surface, wherein the pill cutter is adapted such that the pill receiving surface is adapted to be rotated from a first position to a second position, wherein in the second position the pill receiving surface is more vertically oriented than in the first position.

One aspect of the disclosure is a pill cutter that includes a bladed portion comprising a blade that is adapted to spin to cut a pill, wherein the pill cutter includes one or more sensors that are adapted to sense one or more of motor current or motor speed, wherein an output from the one or more sensors is input to determine one or more of an aspect of motor performance or a blade condition.

BRIEF DESCRIPTION OF THE DRAWINGS

FIGS. 7A-7C illustrate an exemplary pill cutter adapted to rotate a pill in a pill receiving area.

DETAILED DESCRIPTION

The disclosure herein is related to pill cutters, as well as their methods of manufacture and use. One aspect of the disclosure herein includes methods of cutting pills, and optionally includes causing a pill cutter blade to spin as it moves through the pill to cut the pill. In some implementations, the concepts herein may be incorporated into relatively small, easy to handle and transport pill cutters, while in other implementations the pill cutters may be relatively larger size and are not necessarily considered handheld or as easily transportable. With respect to the former, there is a significant technical challenge in implementing one or more of these features in a small, effective, and low-cost product. Handheld pill cutters herein may also include functionality and features found in common pill splitters currently commercialized, such as V-shaped pill receiving areas.

Figure 1:
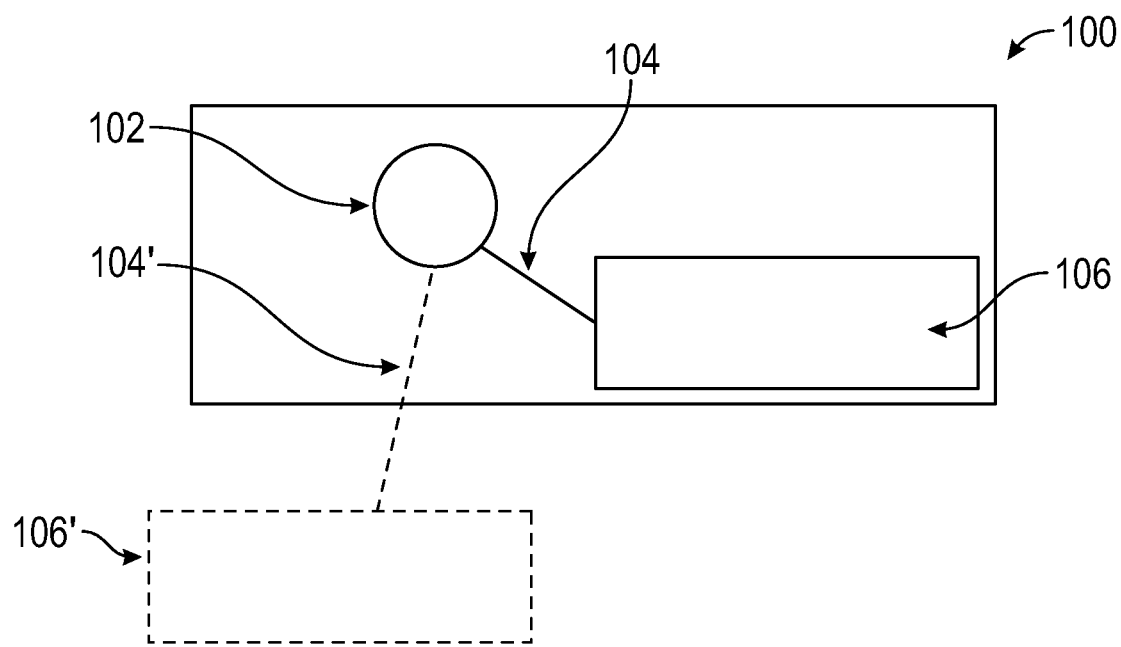
FIG. 1 schematically illustrates an exemplary pill cutter.

FIG. 1 schematically illustrates an exemplary and illustrative handheld pill cutter 100. The handheld pill cutter includes a rotatable or spinnable blade 102 and one or more communication elements 104 or 104' that are in operable communication with the blade to facilitate blade rotation or spinning using energy from an energy source 106 or 106'. The energy source may be an on-board energy source 106 or external to the pill cutter such as energy source 106'. Optional external energy source 106' is shown in dashed lines in FIG. 1.

In some embodiments an on-board energy source or power supply 106 may be a conventional battery, which may be rechargeable and which may be removable from the handheld pill cutter. The energy source may optionally be an external energy source 106' and external to the handheld pill cutter housing. For example, handheld pill cutter 100 in FIG. 1 may include a cord that can be plugged into a wall outlet (AC power supply), or a USB cord, for example. Many different types of energy sources may conceivably be used to provide power to the handheld pill cutter to cause blade rotation and thus pill cutting. Pill cutters herein may optionally include an on-board energy source receiving area or space, such as a receiving area or space with a configuration to stably receive a particular battery therein. For example, without limitation, pill cutters may include a cylindrically shaped energy source receiving area, a coin or button shaped energy source receiving area, a rectangular shaped energy source receiving area, etc. The energy source receiving areas may include electrical connections to facilitate electrical communication between the energy source and a communication element 104 or 104', which may include a motor.

The pill cutters herein may include one or more communication elements 104 or 104' adapted to be in operational communication with an energy source (on-board or external) to facilitate blade 102 rotation. For example without limitation, the one or more communication elements 104/104' may include one or more of electrical communication elements, optical communication elements, or one or more elements that convert energy from one form to another, such as electrical to mechanical such as a motor with a motor shaft rotationally coupled to the blade 102.

Materials and dimensions of the pill cutters herein may be similar to commercially available handheld pill splitters. Handheld pill cutters herein are optionally shaped and sized to be able to be held within or at least operated by a hand of a user. For example, the pill cutters are optionally sized and configured such that they generally fit within a hand of a user. In some instances, handheld pill cutters herein are 2 cm to 20 cm wide (optionally from 5 cm to 15 cm wide), 3 cm to 10 cm high when the cover of a bladed portion is in a closed position relative to a base portion, and 5 cm to 25 cm long (axial or depth dimension). In other implementations, however, any or all of the dimensions may be larger, such as if the pill cutter is a relatively larger, non-handheld pill cutter.

Figure 2:
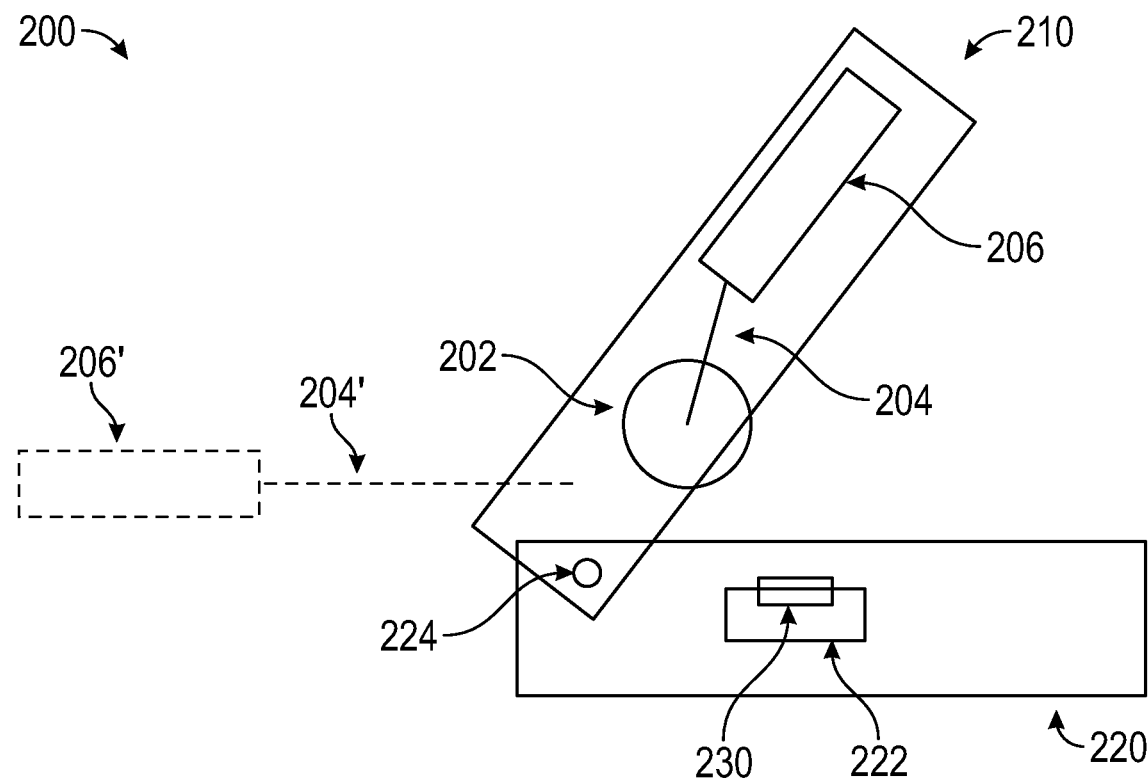
FIG. 2 schematically illustrates an exemplary pill cutter with a bladed portion in an open position relative to a base portion.

FIG. 2 illustrates a merely exemplary and illustrative handheld pill cutter 200, that has a configuration generally similar in some ways to some commercially available handheld pill splitters. The exemplary handheld pill cutter 200 includes a bladed portion 210 that includes a rotatable or spinnable blade 202, and a base portion 220 with a pill receiving area 222 sized and configured to receive pill 230. In this example, the pill is considered to be a horizontal configuration or position relative to a base surface on which it is placed. In this example, bladed portion 210 is movable relative to base portion 220 via a hinged interface 224, as shown. Pill cutter 200 may include an on-board energy source 206 (or at least an on-board energy source receiving area), which may be any of the on-board energy sources described herein. The energy source is optionally disposed in the base portion. Optionally, pill cutter 200 may be coupled to an external energy source 206', such as any exemplary external power supplies herein. In use, bladed portion 210 may be pressed down towards base portion 220 to move blade 202 towards pill 230. The blade is in operational communication with one or more communication elements (e.g., which may include a motor) to cause the blade to spin and cut the pill, which may optionally be initiated automatically when bladed portion 210 is pressed down far enough to a particular position relative to base portion 220. This may also facilitate increased safety to make sure fingers are not injured by the spinning blade.

In any of the embodiments herein, the handheld pill cutter may include one or more circuits that are adapted to one or more of control the blade or monitor the blade, such as controlling the speed of the blade, on/off status of the blade, monitoring to determine if the blade is stuck or otherwise not rotating properly. Such a circuit may, for example, be configured to automatically shut off the blade after a certain period of time, for example, or after a decrease in resistance because the blade has cut through the entire pill. Any of the pill cutters herein may thus further comprise one more computer executable methods (e.g., software, firmware) that are executable by a processor to execute the method and provide one or more outputs.

Any aspects of any handheld pill cutters described herein may be combined with other handheld pill cutters herein, including methods of use, even if not specifically described in combination herein.

Figure 3A:
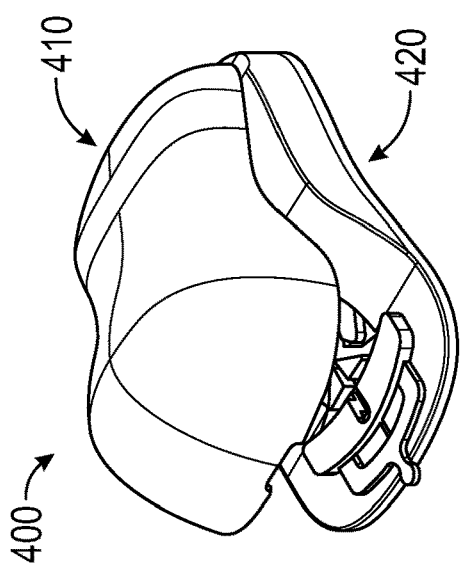
FIGS. 3A-3F illustrates an exemplary pill cutter and an exemplary sequence of using the pill cutter to cut a pill.
Figure 3B:
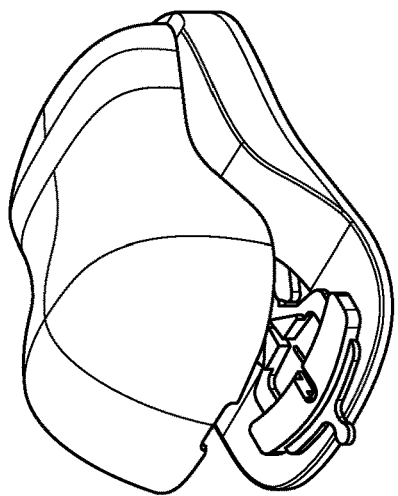
Figure 3C:
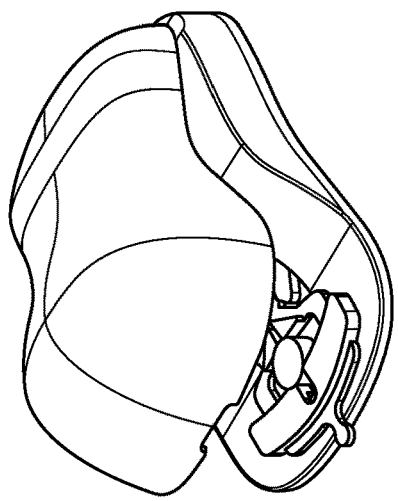
Figure 3D:
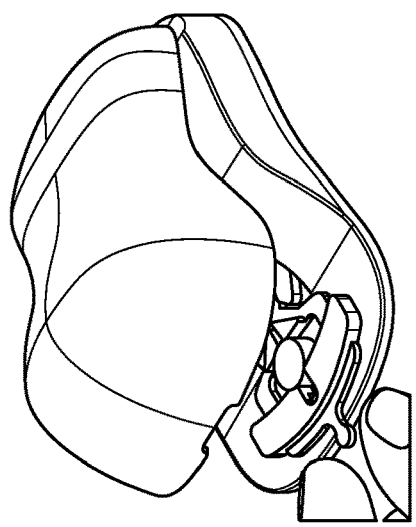
Figure 3E:
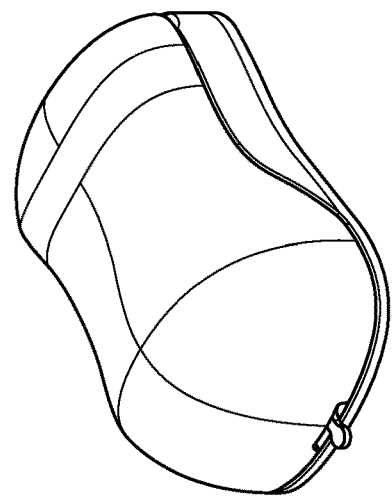

One aspect of the disclosure is related to handheld pill cutters that include a spinnable or rotatable circular blade, wherein the handheld pill cutter is adapted such that the blade cannot begin to spin to cut the pill until a cover or lid (which may be part of any of the bladed portions herein, such as the lids shown in FIGS. 3A-3E) is in a particular configuration, such as a closed configuration relative to a base portion. The cover or lid body is generally considered the main body of the bladed portion, and which is generally pushed down. FIG. 3E illustrates a bladed portion (including a cover body) that is in a closed configuration relative to a base portion. In some instances, the cover may not need to be completely closed relative to the base portion, such as in some particular configuration in which there is little or no risk of the spinning blade cutting a finger in proximity to the blade.

In some embodiments, the blade may or may not be spinnable depending on the position of the blade and/or a blade arm to which the blade is secured relative to one or more positions, such as relative to a non-displaced, at-rest, or neutral position. For example, the handheld pill cutters may be configured such that the blade is not be adapted to spin if the blade is not displaced from a non-displaced or at-rest position when the cover is in a closed (or at least non-opened) configuration. If the blade is not displaced from at-rest position, for example, this may indicate the absence of a pill in the pill cutter, and the blade should not be spinning or spinnable. For example, if a cover is pressed down, and no pill is present in the pill cutter, the blade or blade arm may not be displaced from a neutral, at-rest, or non-displaced position, and the pill cutter can be adapted to prevent the blade from spinning, such as may be desired to conserve power in the energy source. If a pill is present, the blade may be displaced upward by the presence of the pill as the cover is depressed, which is an example of the blade in a displaced position or configuration.

After the blade has begun to spin (which in some examples may only be initiated if the blade is displaced from a non-displaced position), the pill cutter may be adapted and configured to stop the blade from spinning or cause the spinning to slow if the blade moves from the displaced position to the at-rest position (which may be referred to as a neutral or non-displaced position), which may indicate that the blade has cut through the entire pill. The pill cutters herein may thus be adapted to automatically stop the blade from spinning after the pill has been cut, which can help save energy as well as indicate to the operator that the pill is cut and the cover can be lifted. Additionally, the pill cutters can be adapted such that if the cover is raised after blade spinning has begun but before the pill is completely cut, the blade will automatically begin to slow or stop to minimize the risk of injuring the operator.

Any of the pill cutters herein may be adapted to deactivate a motor, which causes the blade to stop spinning or slow if the blade moves to a non-displaced position (or other position). Any of the pill cutters herein may include a switch that is adapted to indicate that the blade or blade arm is or is not in the neutral position.

Any of the pill cutters herein may include an energy source that is in electrical communication with a motor. The motor may include or be rotationally coupled to a shaft that is directly or indirectly in communication with the blade. Energy from the energy source may thus indirectly cause the blades herein to spin, which facilitate cutting of the pill.

In any of the embodiments herein (including blades that do not spin, as well as circular blades that are adapted to spin), the pill cutter may include one or more springs in indirect operable communication with the blade or blade arm, wherein the spring is adapted to cause the blade to move in a direction through the pill to cut the pill. For example, any of the pill cutters may include a spring that is compressed as the lid is closed to a closed position, wherein the one or more springs are adapted to cause the blade and/or blade arm to move towards a non-displaced position as the blade spins and cuts the pill, wherein the movement towards the non-displaced position cause the blade to cut the pill. By having a spring cut the pill rather than an operator, an operator need not necessarily have to continue to apply enough force on the lid to make sure the blade cuts through the pill. The pill cutter can be adapted such that the spring does not cause the blade to move and cut the pill until the lid is fully closed (e.g., with a switch). In any of these embodiments, the pill cutters may include first and second switches: a first switch for when a cover is moved to a closed configuration (e.g., FIG. 3E), and a second switch for when the blade and/or blade arm are not in a displaced position (e.g., if the blade has finished cutting the pill).

In any of the examples herein, the pill cutter may be adapted to prevent an operator from causing too much blade force from being applied to the pill (e.g., from too much lid closing force), which may cause a motor to stall or a blade to be damaged. In some examples, the pill cutters herein may include a spring that is coupled to the cover or lid, and wherein the force of the blade on the pill is limited by the spring, which also gently drives the blade through the pill, as is described above.

In some examples that include a spinnable blade, pill cutters herein may have a motor that is out of direct connection with the blade, e.g., via gearing so the motor does not crash down on the pill, which may allow larger pills to be placed in the receiving area and cut therein.

One aspect of the disclosure is related to a feedback arrangement that can indicate when to replace a blade. For example, any of the pill cutters herein may be adapted (e.g., with one or more of circuitry and computer executable method(s)) adapted to sense or measure motor current, wherein an increase in current may indicate that the motor is not cutting through the pill as easily, which may indicate the blade is worn. This may indicate that the blade should be replaced. Any of the pill cutters herein may have one or more control modules and/or algorithms stored thereon that are adapted to receive as input motor current or information indicative of motor current and determine if the measured current or information is above a limit and/or outside of an acceptable range. The pill cutters herein may include an alert indicator (e.g., LED) that can be activated to indicate to the user to replace the blade or take other action (e.g., clean the pill cutter).

Additionally, any of the pill cutters herein may include a stall sensor on a motor (if the pill cutter includes a motor) that may be adapted to detect if the blade stalls in the pill. One or more modules, algorithms and/or microprocessors in the pill cutter may be adapted to indicate a stall state of the motor.

Additionally, any of the pill cutters herein that include a spinnable blade may have a removable spinning blade or removable spinning blade assembly, which may be replaced if the blade is, for example, no longer functional or worn.

An optional aspect of this disclosure is related to adjusting the position of the pill in the pill cutter, the concepts of which may be incorporated with cutters that include spinning blades as well as traditional pill splitters that do not include spinning blade. Some existing pill splitters include a component or mechanism that provides the ability to slide the pill in a direction along a plane of the blade (e.g., in U.S. Pat. No. 8,590,164), which is essentially a front-to-back axial movement and generally occurs as a way to clamp or grip the pill in the splitting area. One aspect of the disclosure herein provides methods and devices for further adjusting the position of the pill in a direction other than along a plane of the blade (i.e., other than just an axial, +/−y, direction). In some instances, the pill cutters are adapted such that the position of the pill can be adjusted or moved laterally, which is also referred to herein as having some side-to-side movement, or in the "x" direction of a coordinate system, which is illustrated in FIG. 6B. In some instances, the pill cutter is adapted such that the position of the pill can be adjusted rotationally relative to a rotational axis of the base portion. In some instances, the pill cutter is adapted such that the position of the pill can be adjusted laterally and rotationally.

Pill cutters herein may be adapted such that lateral and/or rotational adjustments to the pill position can be made after the pill is secured (e.g., gripped or clamped) in a pill receiving area. Being secured in this context may also be referred to as being clamped in place, or held in place, as generally occurs in traditional pill splitters. When the pill is secured, as that term is used herein, the pill may be in contact with at least two generally opposing surfaces (not necessarily directly opposing) that work together with the pill to secure the pill in place. For example, a small section of a pill that is only contacting a single surface such that the pill can be easily displaced from its position is generally not considered to be secured in the pill receiving area. A pill may be secured such that movement of the pill cutter (e.g., turning it upside down) does not cause the pill to become unsecured.

Lateral and/or rotational adjustment of a pill as set forth herein can provide the ability to adjust a lateral position of the pill and/or the rotational orientation of the pill relative to a plane of the blade, which refers to the plane through which the blade moves or follows as it moves down and cuts. These types of adjustments provide the ability to provide more control of the position of the pill to cut the pill along a desired cut line and/or cut a pill into pieces that are not equally sized (e.g., two halves), for example.

It is understood that while some of the disclosure herein is related to circular blades that are spun to cut a pill, methods of pill position adjustment herein may be implemented in pill cutters that do not utilize a spinning blade. For example only, any pill splitter or method of use described in U.S. Pat. No. 8,590,164 may be modified to include any of the additional pill position adjustments herein, such as lateral and/or rotational pill adjustment concepts described herein.

Figure 3F:
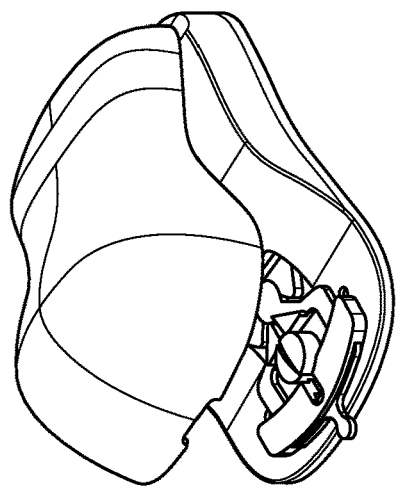
Figure 4A:
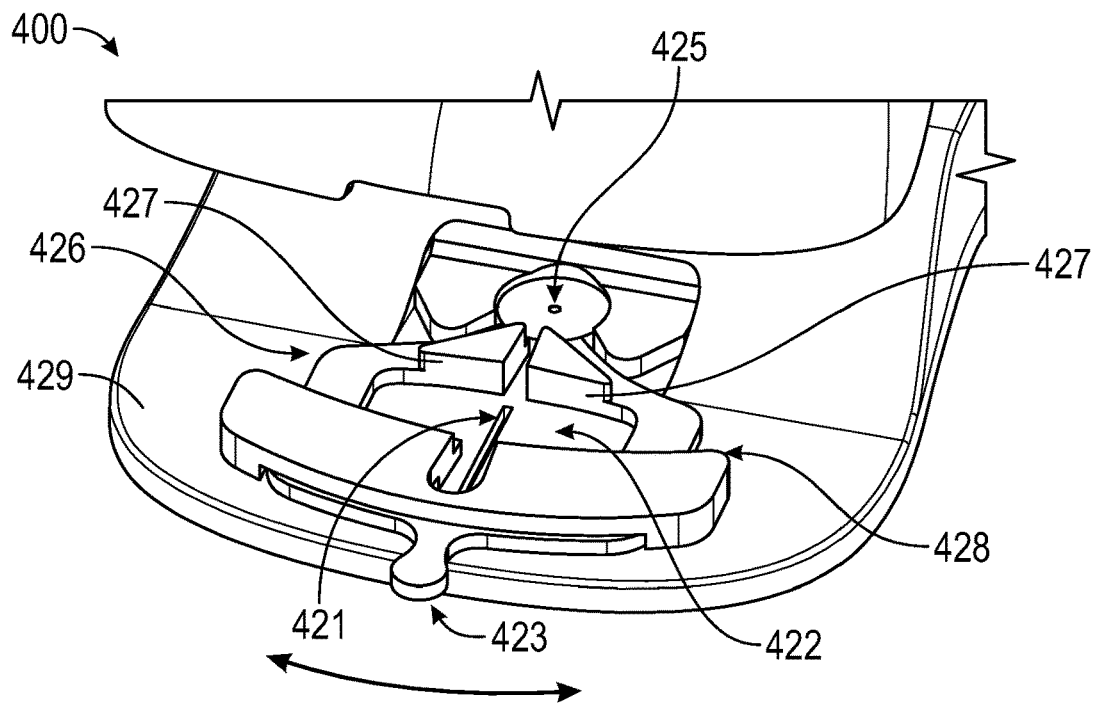
FIGS. 4A and 4B illustrate an exemplary pill receiving area of the pill cutter from FIGS. 3A-3F.
Figure 4B:
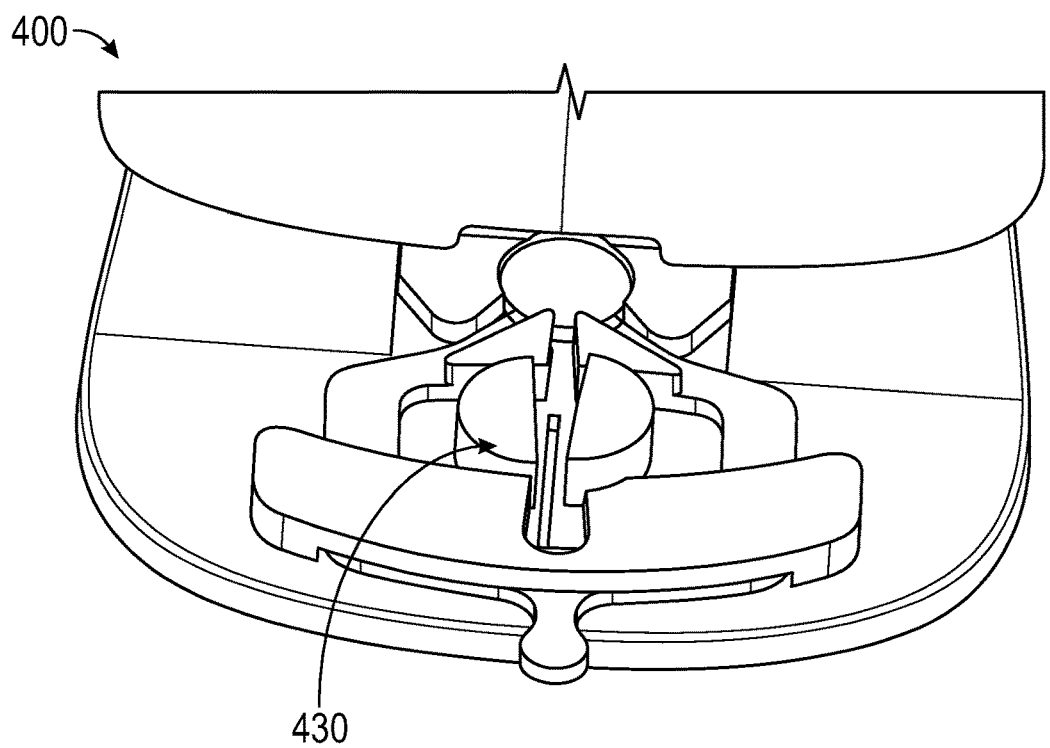

FIGS. 3A-3F and 4A and 4B illustrate a merely exemplary handheld pill cutter 400 that illustrates a merely exemplary way to provide lateral and/or rotational adjustment to the position of a secured pill. FIGS. 4A and 4B illustrate components of a pill securing and adjusting assembly in detail which are also shown in FIGS. 3A-3F, while FIGS. 3A-3F provide an exemplary general sequence of steps to cut a pill, which incorporates the exemplary pill securing and adjusting assembly shown in FIGS. 4A and 4B.

In this example, handheld pill cutter 400 includes base portion 420 with a pill receiving area 422. Pill receiving area 422 comprises a region of base surface 429 illustrated in FIG. 4A. Pill cutter 400 includes bladed portion 410 which includes a blade (not visible). Pill cutter 400 includes pill securing member 428, which is disposed to be movable by a user relative to pill receiving area 422 to secure pill 430 between at least first and second surfaces (e.g., surface 427). FIG. 3C illustrates a pill secured in pill receiving area 422, and in this embodiment is between at least one surface 427 of pill adjustment member 426 and at least one surface of pill securing member 428, as shown in FIG. 3C.

Pill cutter 300 also includes a pill adjustment actuator 423 that is operably coupled to pill adjustment member 426. Pill adjustment member 426 is movable relative to pill receiving area 422 upon user actuation of pill adjustment actuator 423 to facilitate lateral movement of the secured pill 430 relative to a blade plane.

To prepare to load and secure a pill, pill stabilizing member 428 may be moved axially towards the front of the pill cutter (in the −y direction) to the position shown in FIGS. 3B and 4A to provide access to pill receiving area 422. This is an example of a pill stabilizing member adapted to slide relative to a pill adjustment member. Axially in this context may also be referred to as the front-to-back direction relative to the base portion, or the +/−y direction of a coordinate system, as is illustrated in FIG. 6B. It is understood that in some embodiments, a movable pill securing member may be initially set in the position shown in FIGS. 3B and 4A. In some optional embodiments the movable pill securing member may be adapted with an at-rest (or less stressed) position, such as the position shown in FIG. 3A (such as via a spring force) such that when the movable securing member is moved (e.g., spring stretched) to a stressed position in FIG. 3B, the spring force will cause the movable pill securing member to automatically revert to or towards the less stressed position shown in FIG. 3A. Alternatively, in some embodiments, the pill cutter may be adapted such that an operator may simply push or slide the pill securing member distally forward (i.e., in the positive y direction). In this embodiment, movable pill securing member 428 includes one or more surfaces as shown that are arranged to interface with pill adjustment member 428 such that the movable pill securing member 428 slides relative to pill adjustment member 426, as shown in FIG. 3C. Pill adjustment member 426 thus acts a guide for the movement of movable pill securing member 428. In this example, securing member 428 is adapted to slide axially relative to pill adjustment member 426.

Figure 5:
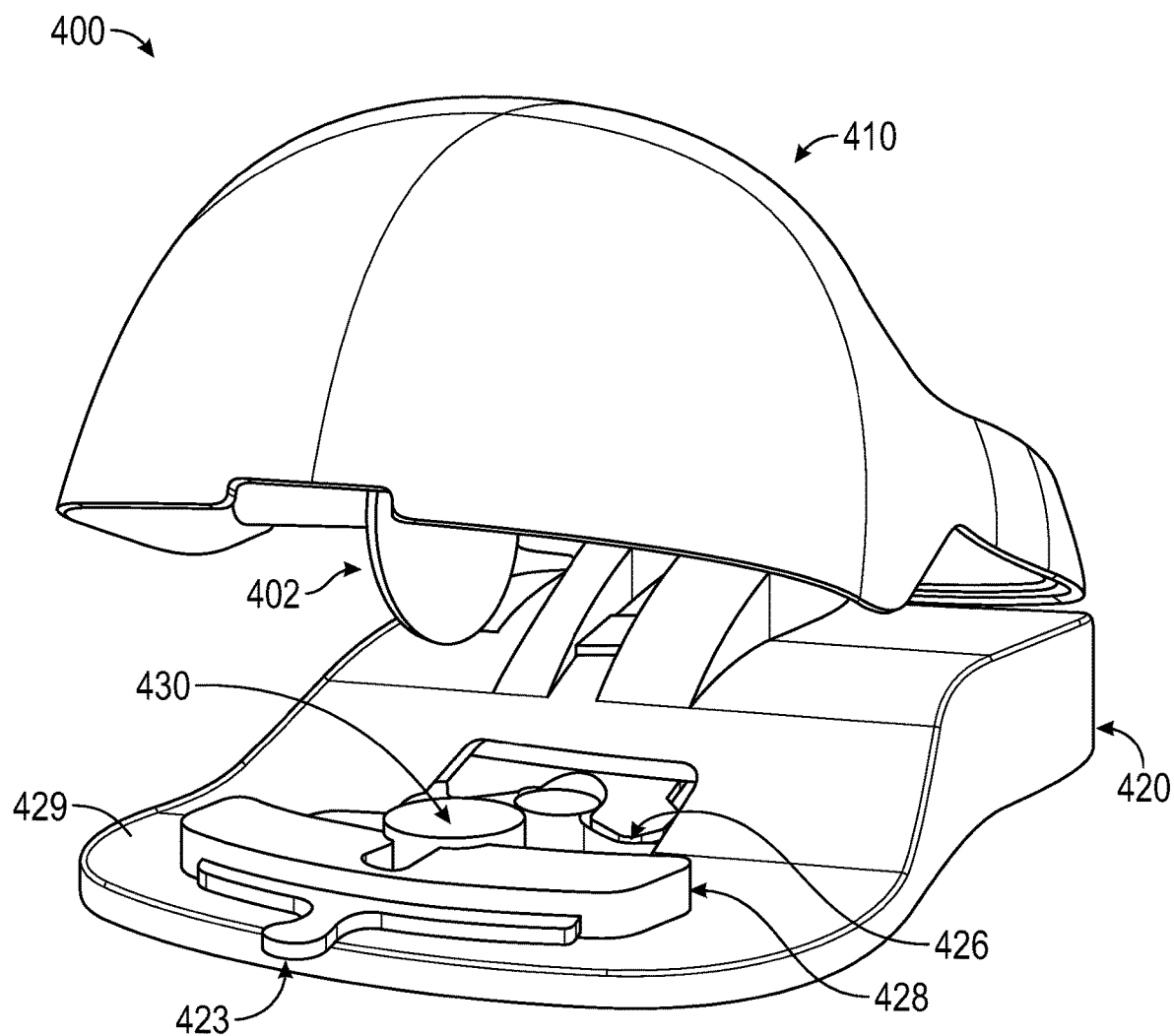
FIG. 5 illustrates an exemplary pill cutter that is substantially similar to the pill cutter from FIGS. 3A-4B.

When pill securing member 428 is in a position to provide access to the pill area, a pill can be placed within pill receiving area 422, such as is shown in FIG. 3C and FIG. 5. In some embodiments, a user may release the pill securing member, which may cause the pill securing member to automatically slide forward and cause the pill to be secured or clamped in the pill receiving area between surfaces of the securing member and the adjustment member, as is shown in FIG. 3C and FIG. 5. In alternative embodiments, the pill securing member may be pushed forward to cause the pill to be secured (clamped) in place in the pill receiving area. FIG. 4A illustrates exemplary pill adjustment member surfaces 427 against which the pill may be clamped or gripped when the movable pill securing member 428 moves forward. Surfaces 427 may be considered to be part of a fence which forms a backstop for the pill.

After the pill is secured or clamped in the pill receiving area, the position and/or rotational orientation of the pill may be adjusted, which may provide the exemplary benefits set forth herein.

In the merely exemplary embodiment shown in FIGS. 3A-5, pill cutter 400 includes a first pill adjustment member, which refers generally to one or more components that can be actuated or moved to adjust the position of the pill laterally and/or rotationally relative to a plane of the blade. Lateral movement in this context may comprise solely lateral movement, such as movement purely in a +/−x direction in a coordinate system. Lateral movement may also include some x direction movement as well as some +/−y directional movement in the coordinate system. The movement may or may not include rotation of the pill about an axis. Lateral and/or rotational movement is described herein as movement caused by one or more components of the pill cutter other than by a user directly touching a surface of the pill. A user may touch and move a pill adjustment member, but this type of movement generally does not rely on a user directly contacting a surface of the pill to move it. This may be referred to generally as indirect user pill positioning adjustment after pill capture (pill securing).

In the merely exemplary embodiment shown in FIGS. 3A-5, pill cutter 400 includes pill adjustment actuator 423, which in this example is unitarily formed with pill adjustment member 426 and is considered an extension of pill adjustment member 426. Actuator 423 is positioned relative to the pill receiving area and is sized and configured to be grabbed or touched by a user and moved by a user to cause movement of pill adjustment member 426, which repositions pill 430 secured in the pill receiving area.

In the example shown in FIGS. 3A-5, pill adjustment member 426 is adapted and configured to be moved laterally and rotationally, as shown in FIG. 4A by the double arrow line, about rotational axis or pivot 425 shown in FIG. 4A. FIG. 3F illustrates a user hand in the process of grabbing the pill adjustment actuator to cause one or both of lateral and rotational movement. Movement of pill adjustment member 426 in this embodiment caused by user movement of actuator 423 causes some rotational movement of pill adjustment member 426 and movable pill securing member 428, which causes movement (e.g., rotational) of the pill that is secured or gripped in the pill receiving area between the movable pill securing member and the pill adjustment member surface(s), all of which are moving rotationally relative to the rotational axis 425. Movement of actuator 423 in this particular example also causes lateral, or side-to-side movement of the pill relative to the blade plane. Slot 421 shown in FIG. 4A also generally includes the plane of the blade, which is the plane in which the blade moves or follows as it is moved downward. A blade path as that phrase is used herein generally refers to the path of the blade and is disposed in a blade plane. The slot may alternatively be any other type of marker or indicator (e.g., a line) on the base that indicates on the base of the pill cutter where the blade plane is. The position of the pill can be adjusted with reference to the blade marker (e.g., a slot, line) so that a user can visualize where the cut line will be on the pill, and thus a marker can help adjust the pill to the desired position in the pill receiving area based on the desired cut. The moveable pill securing member may be pulled forward towards the front of the pill cut in the negative y (−y) direction at any time (such as to loosen the grip on the pill) as desired to help further adjust the position of the pill.

This is an example of a pill cutter adapted to move a secured pill in direction that does not follow a blade plane. This is also an example of a pill cutter that is adapted to cut a secured pill into pieces of unequal size.

After the pill is in the desired lateral position and/or rotational orientation relative to the blade plane, the pill may then be cut. If the blade is adapted to spin, any aspect of any of the disclosure herein related to a spinning blade may be included in this example, as the spinnable blade that is shown in the example of FIG. 5. Pill cutter 400 may alternatively have a more traditional blade that is part of the bladed portion and that is pressed down towards the base portion to cut the pill. FIG. 3E illustrates a cover body of the bladed portion after is has been pressed or pushed down, and which is an example of a closed position of the bladed portion. In some examples the blade may then be activated to cause it to spin to cut the pill, as shown in FIG. 3F. In some embodiments the blade activation may be automatically initiated by the pill cutter. In some examples it may be manual activated by the user, such as by, for example only, pressing a button on the pill cutter.

Any of the pill adjustment actuators herein, such as actuator 423, may be held or maintained in position by a user, which may help or be required to keep the pill in a desired position during cutting.

Pill cutters herein may optionally include one or more removable pill adjustment members, which may facilitate easier cleaning of the pill area. For example only, in FIGS. 4A and 4B, pill adjustment member 426 includes a head (circular head in this example as shown) through which the rotational axis 425 passes, wherein the head may be releasably magnetically coupled to a second magnetic material in the base portion over which it is situated. The magnetic coupling can be strong enough to maintain adjustment member 426 associated with the base portion, yet easy enough such that an operator can easily remove adjustment member 426, which can allow the pill receiving area to be more easily cleaned when the adjustment member is removed. The adjustment member(s) can then be re-coupled (magnetically) to secure it to the base when ready for subsequent use.

Pill cutters herein may include a motor and/or or one or more switches. A motor and/or one or more switches may be at least partially sealed so that ground pill dust cannot enter those regions, minimizing the likelihood or preventing the pill cutter from malfunctioning.

Figure 6A:
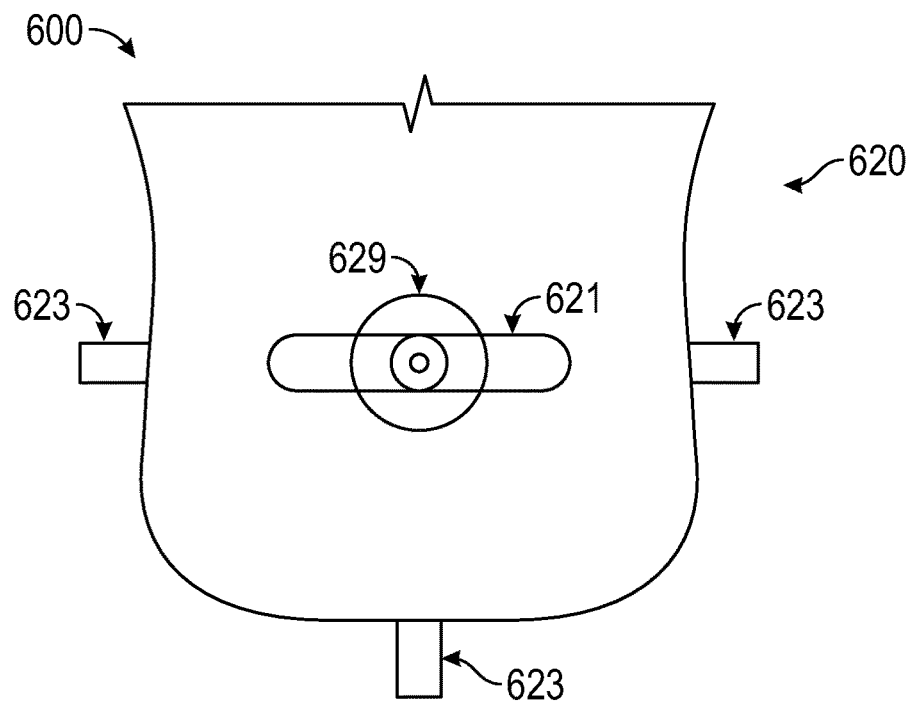
FIGS. 6A and 6B illustrate an exemplary pill adjusting assembly of an exemplary pill cutter.
Figure 6B:
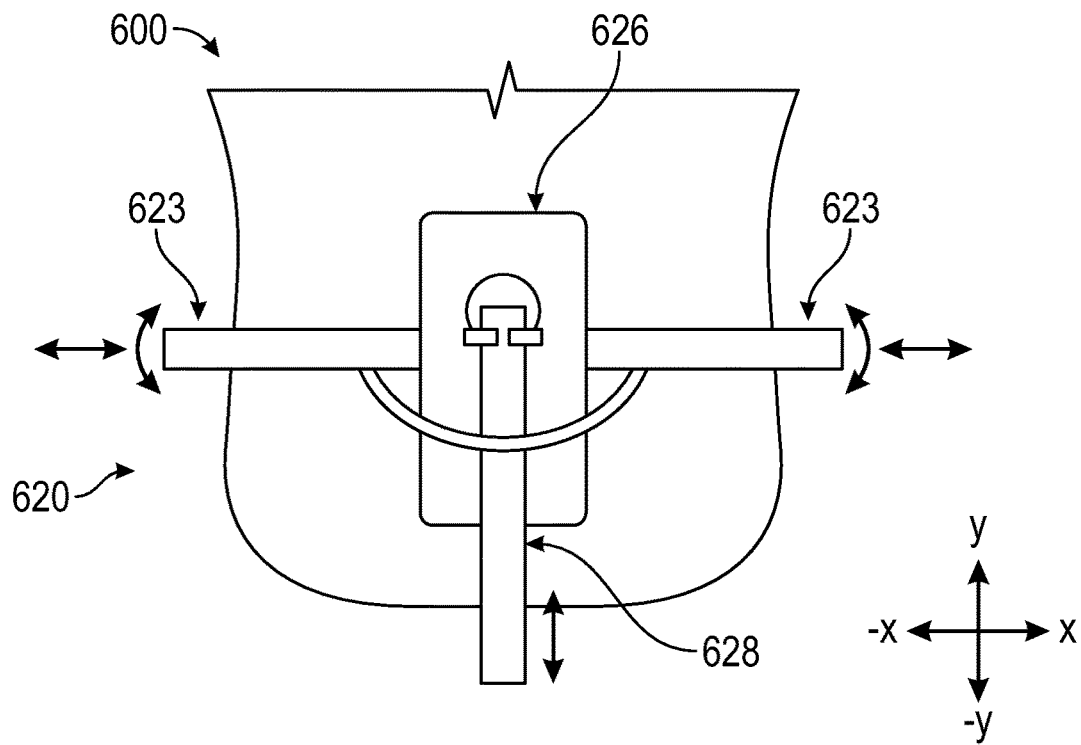

FIGS. 6A and 6B illustrate an exemplary base portion 620 of an exemplary pill cutter 600. Pill cutter 600 includes pill adjustment member 626. FIGS. 6A and 6B illustrate bottom and top views of base portion 620 of cutter 600, without a pill therein for clarity. A bladed portion, which includes a cover body and a blade, is not shown for clarity, but may include any other features of any bladed portion herein. In this embodiment, pill adjustment member 626 comprises a movable stage upon which a pill may be placed and secured. Pill adjustment member 626 is operatively coupled to first and second side pill adjustment actuators 623 as shown, which in this example extend generally laterally from adjustment member 626 as shown and are positioned to be grabbed by a user to move pill adjustment member 626. Pill adjustment member 626 is adapted to be moved laterally and rotationally relative to base portion 620.

Pill cutter 600 also includes a movable pill securing member 628 as shown, which is adapted to move axially (in the +/−y direction) relative to pill adjustment member 626 to secure or clamp a pill in the pill receiving area, which includes a top surface of the movable stage in this embodiment. Pill securing member 628 may slide within a channel or slot within the movable stage, for example without limitation. In alternatives, pill cutter 600 may include a single actuator 623.

The one or more laterally extending side adjustment actuators (in this example there are two) are adapted to actuated to create and cause lateral movement of the stage (and a pill secured thereon) and/or rotational movement of the stage (and a pill secured thereon), for the exemplary benefits described herein. The stage may be movably secured to base portion 620 (yet laterally and rotationally movable thereto) with a retainer or other securing member 629 situated on the bottom side opening or slot 621, an example of which is shown in FIG. 6A. Retainer 629 has at least one dimension that is larger than a corresponding dimension of slot 621, which prevents pill adjustment member 626 from being completely disassociated from base portion 620.

In this embodiment, there is a rotational axis, which passes through the movable stage. The rotational axis in this example is thus movable relative to base portion 620 and thus movable to a blade plane. In this example, the pill can be moved solely laterally without rotating the pill, and vice versa, by controlling the movement of the pill adjustment member (i.e., lateral movement and rotation are uncoupled). This is also an example of a pill cutter that is adapted such that pill may be simultaneously moved laterally and rotationally relative to base portion. Front actuator 623 allows for axial movement of the pill securing member 628 to facilitate securing the pill in place against a fence, as shown.

In any of embodiments, herein, the blade may be stainless steel, and optionally diamond sintered.

One aspect of the disclosure relates to pill cutters in which the pill is cut when the pill is in an orientation other than a traditional horizontal position (or nearly horizontal) relative to a pill receiving surfaces on which the pill is positioned. The blade may work best when the linear length of the cut (illustrated in FIG. 9B) is minimized. For example, the linear length of the cut may be less when the pill is upright than when the same pill is placed in a traditional horizontal position (or nearly horizontal) on the surface with the blade cutting through the larger-dimension top or bottom surfaces of the pill. Traditional pill splitters may split the pill through the top or bottom of the pill, in which case the linear length of the cut may be greater than in this aspect of this disclosure. Decreasing the linear length of the cut (e.g., by positioning the pill upright) can advantageously reduce torque, create less dust when cutting, and cause less vibration. As shown in FIG. 9B, pill splitters herein may be adapted to position a pill in a position such that the linear length of the cut is less than the cut height through the pill, as shown in the example of FIG. 9B.

In these examples, the pill may be referred to as being in a non-horizontal position relative to a surface on which it sits when secured in the pill receiving area. In some instances, the pill may be more vertically oriented than horizontally oriented, and is considered upright even if not completely vertically oriented relative to the surface on which is disposed.

FIGS. 7A-10B illustrate examples of pill cutters configured for non-horizontal pill cutting, methods of pill loading into non-horizontal positions, as well as methods of cutting pills when they are in non-horizontal positions.

FIGS. 7A-7C illustrate exemplary pill cutter 1000. FIGS. 8A-8D illustrate in detail an exemplary securing and rotation assembly 1050 that is part of pill cutter 1000. Pill cutter 1000 is also an example of a pill cutter that is adapted and arranged to rotate a pill into a non-horizontal position before cutting the pill, which is unlike traditional pill splitters.

Figure 8A:
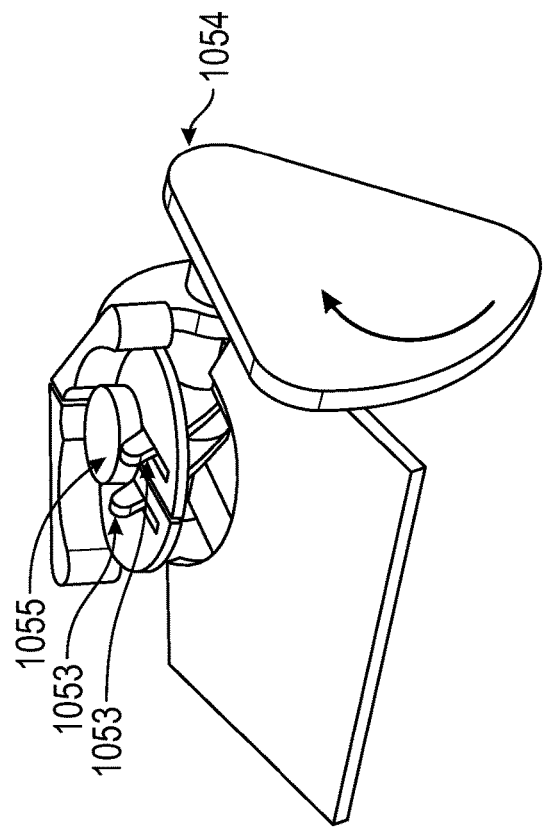
FIGS. 8A-8D illustrate an exemplary assembly adapted to rotate a pill to a non-horizontal position for cutting.
Figure 8B:
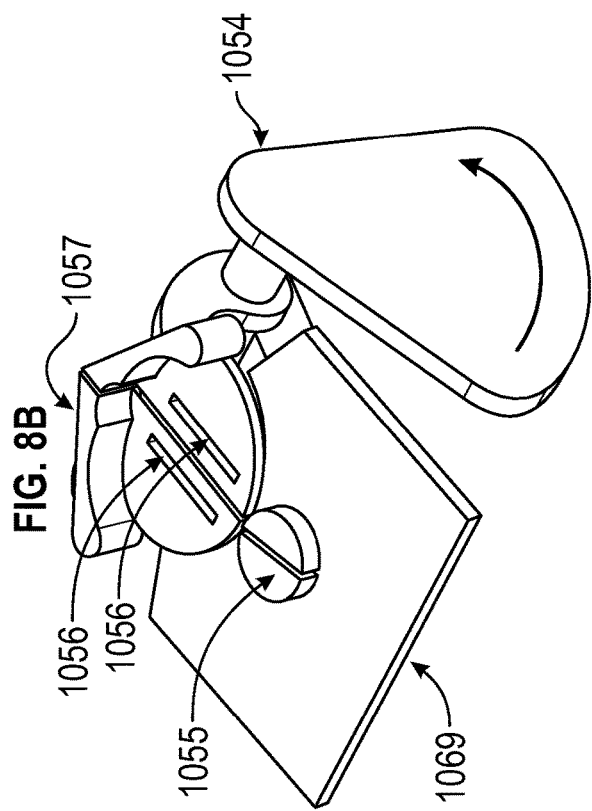
Figure 8C:
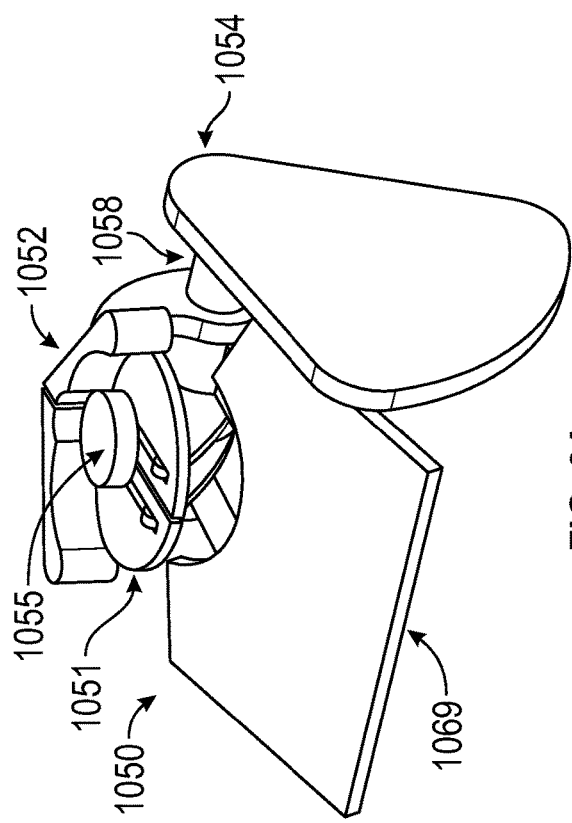

FIGS. 8A-8D illustrate in more detail securing and rotation assembly 1050 that is shown as part of the pill cutter in in FIGS. 7A-10B. FIG. 8A shows pill 1055 after it has been placed on platform 1051. Actuator 1054 is coupled to shaft 1058 and pill securing members 1053 such that when an operator rotates actuator 1054, pill securing members 1053 rotate upward through platform slots 1056 from the position in FIG. 8A and into contact with pill 1055, as shown in FIG. 8B. Rotation of actuator 1054 secures the pill in the pill receiving area between pill securing members 1053 and fence 1052 (labeled in FIG. 8A) while on platform 1051, as shown in FIG. 8B. Continued rotation of actuator 1054 rotates all of pill securing members 1053, platform 1051, the pill 1055 secured in the pill receiving area, and the fence, as shown in FIG. 8C. The transition between FIGS. 8B and 8C shows the pill being rotated into an upright, non-horizontal position. The rotation to the non-horizontal cutting position in also shown in FIG. 7C. FIG. 7B shows a pill placed on the platform but not yet secured and rotated to the non-horizontal cutting position. FIG. 7A shows pill cutter 1000 before the pill is placed onto the platform. FIG. 7A also shows spinnable blade 1002 coupled to blade arm 1003 that are part of bladed portion 1010, and base portion 1020. A blade arm like blade arm 1003 may be incorporated into any of the pill cutters herein. The blade arms herein may be coupled to or part of any of the bladed portions herein. Any of the blade arms may be secured to but movable with respect to a cover or lid portion of the blade portion, which is described in more detail herein.

Figure 8D:
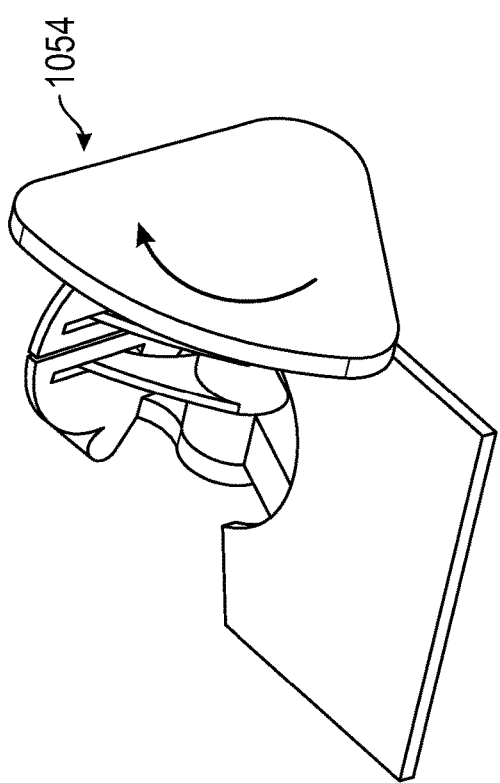
Figure 9A:
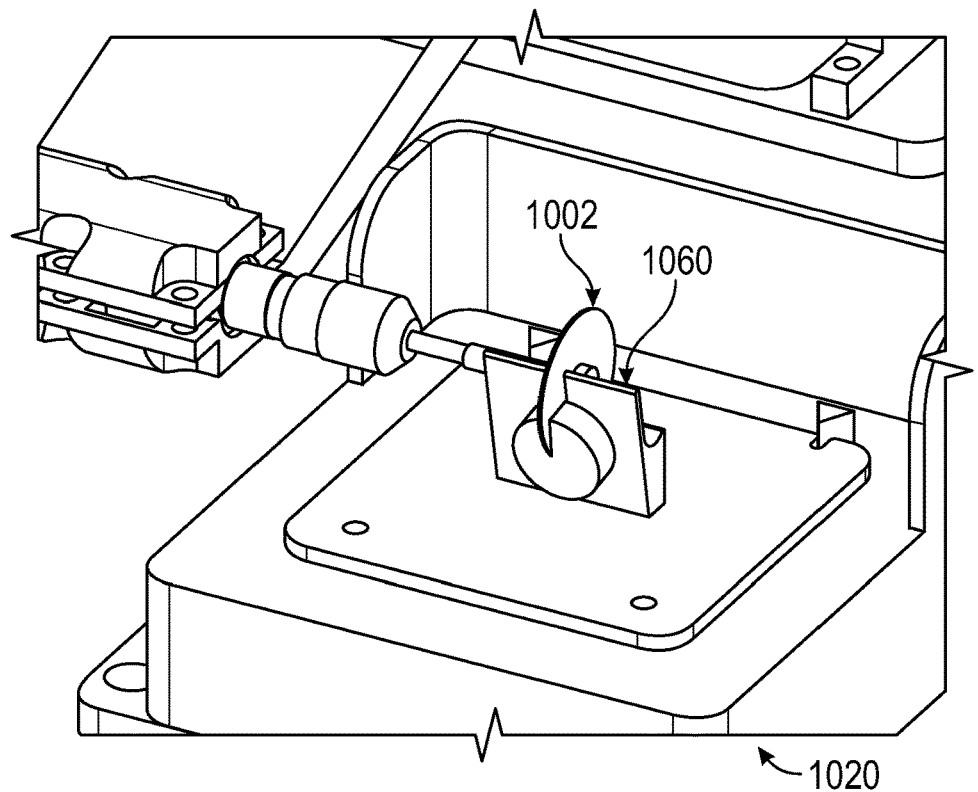
FIGS. 9A and 9B illustrate an exemplary pill in a non-horizontal cutting position.
Figure 9B:
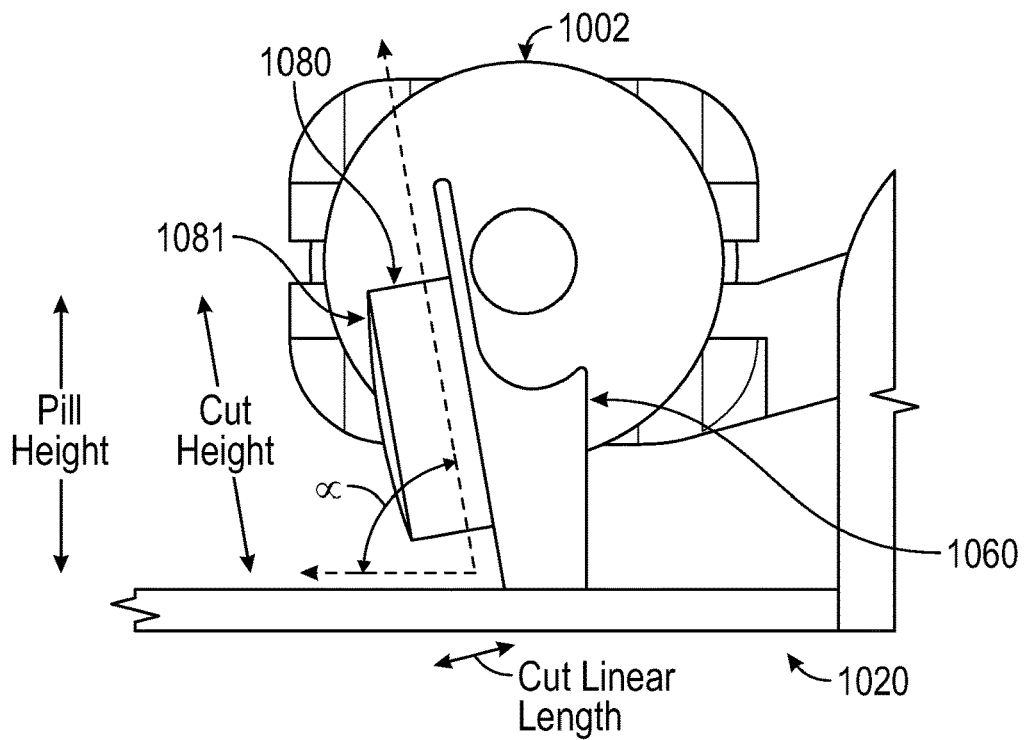
Figure 10A:
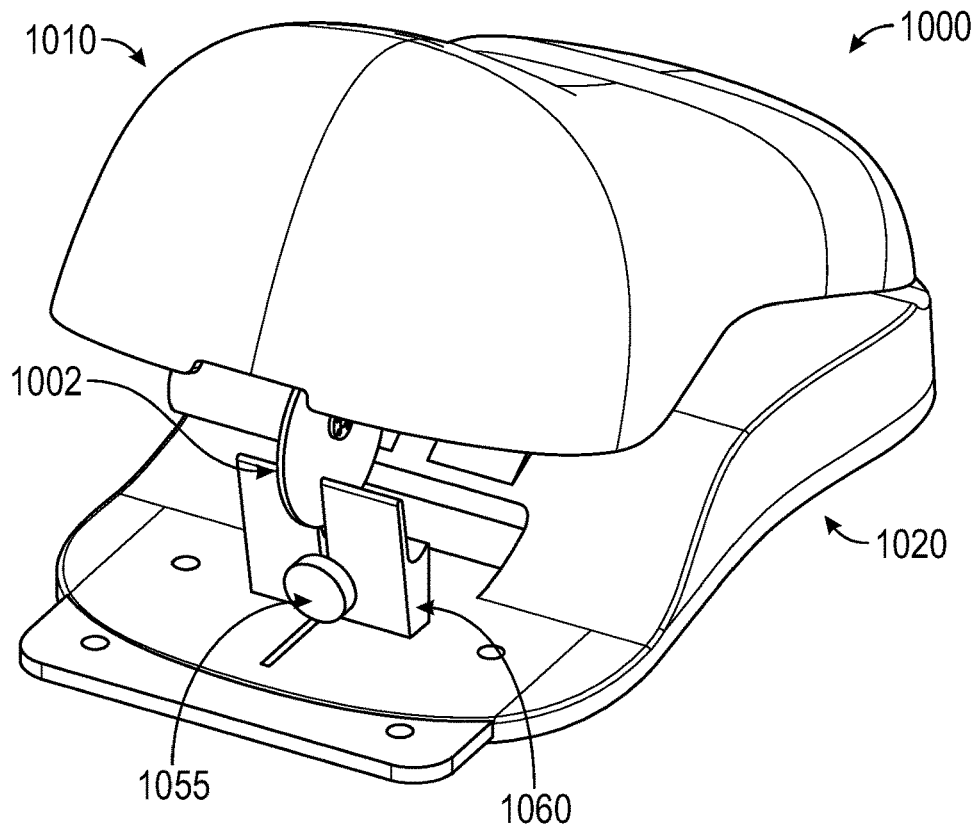
FIGS. 10A and 10B illustrate an exemplary pill cutter adapted to secure and cut a pill in a non-horizontal position.
Figure 10B:
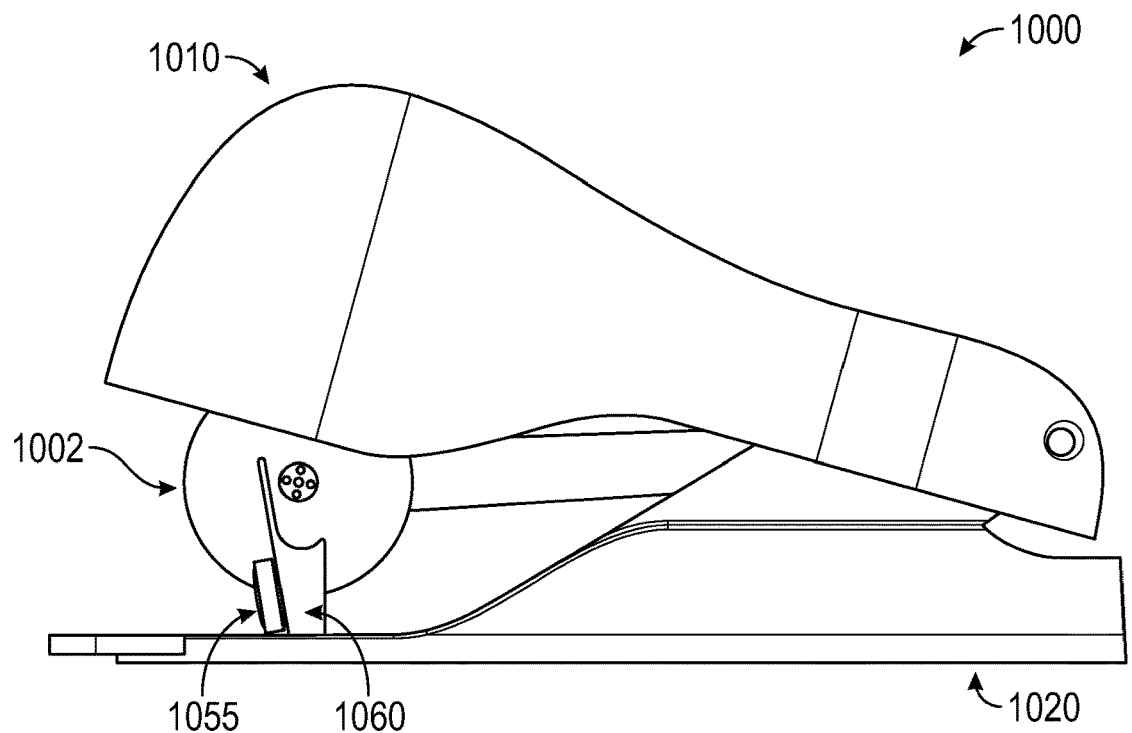

FIGS. 9A, 9B, 10A and 10B illustrate pill cutter 1000 without the pill securing and rotation assembly 1050 for clarity, with FIGS. 9A and 9B showing the pill cutter more schematically than FIGS. 10A and 10B. Base portion 1020 includes base fence 1060 with a slot therein to accommodate the blade, as shown in FIGS. 9A-10B. As the pill 1055 is rotated as shown between FIGS. 8B and 8C, the pill moves into a non-horizontal secured position shown in FIGS. 9A and 9B, and is secured between platform 1051, fence 1052, and base fence 1060. The bladed portion 1010 may then be pressed downward and the blade activated and spun to cut the pill, as shown in FIGS. 9A, 9B, 10A and 10B. Once the pill is cut, actuator 1054 can be rotated back, which causes the rotation of the platform 1051 and the cut pill, as shown in FIG. 8D. Rotating the platform and pill as shown in FIG. 8D allows the pill to optionally fall onto ramp 1069 as shown in FIG. 8D, where the user can retrieve the cut pill 1055.

As illustrated in FIG. 9B, the linear length of the cut is less than the cut height through the pill. The pill shown in FIGS. 9A-10B is also an example of a pill in a non-horizontal position in which a pill height relative to a base portion surface on which the pill is disposed is greater than a height of the pill if the pill were placed in a horizontal configuration, such as if it were sitting on a tabletop. The pill shown in FIGS. 9A-10B is also an example of a pill that is non-horizontal but not completely vertically disposed. The arrangement in FIGS. 9A-10B is also an example of cutting through a pill such that the blade contacts a side 1080 of the pill before it contacts one or both of a top or a bottom 1081 of the pill, wherein if the same pill were sitting on a horizontal surface with bottom 1081 on the horizontal surface, side 1080 of the pill would have a height dimension that is less than a greatest linear distance across the top and less than a greatest linear distance across the bottom 1081.

Figure 11:
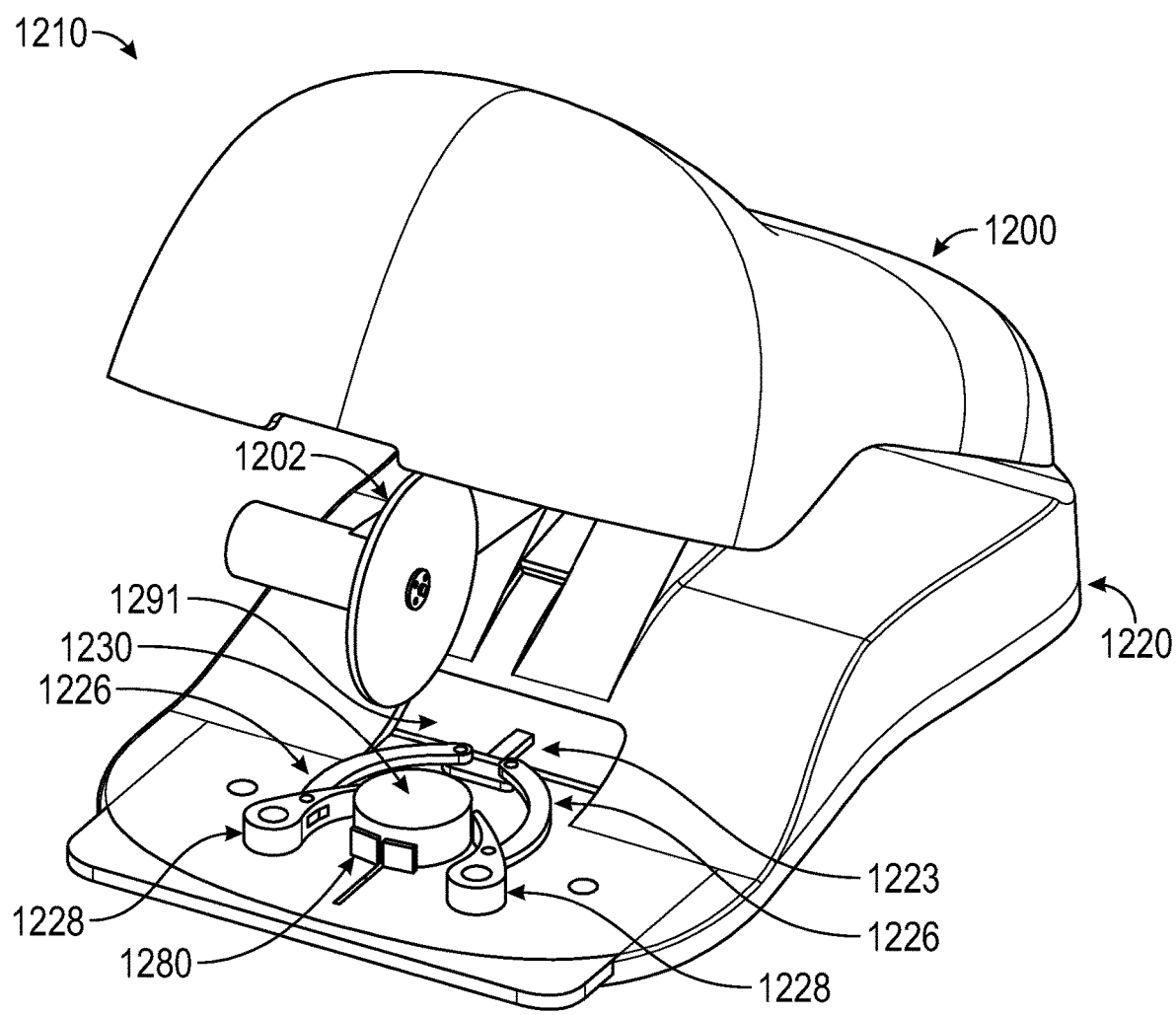
FIG. 11 illustrates an exemplary pill cutter that is adapted to secure a variety of pills having different shapes and sizes.

FIG. 11 illustrates an exemplary handheld pill cutter 1200 including bladed portion 1210 and base portion 1220 hingedly coupled thereto. Pill cutter 1200 includes a blade 1202 that is optionally adapted to be spun to cut the pill, and may thus include any features of any of the pill cutters herein that include a spinnable blade. Pill cutter 1200 may include any other suitably combinable feature of any other pill cutter herein, such as a power source and a motor, for example.

Pill cutter 1200 includes pill adjustment actuator 1223 that is disposed to be held and actuated by an operator. In the example shown, base portion includes window or opening 1291 through which pill adjustment actuator 1223 is accessible to be held and moved. FIG. 12B illustrates an alternative arrangement in which pill adjustment actuator 1223 is situated towards the front of the pill cutter (front is downward in FIG. 12B). The pill adjustment actuator can thus be disposed in either location depending on the arrangement of the pill securing assembly relative to the base portion. As shown in FIG. 12B, pill adjustment actuator 1223 is hingedly coupled at interfaces 1293 to first end regions of first and second pill adjustment members 1226, as is shown. First and second pill adjustment members 1226 are also hingedly coupled at second end regions to first and second pill securing members 1228, as shown. Pill securing members 1228 interface with the base portion at hinged interfaces 1281, which allows the securing members to pivot relative to the base surface at interfaces 1281. This arrangement allows a user to interact or interface with a single pill adjustment actuator 1223 and indirectly control the position of the first and second pill securing members 1228, which facilitates securing or clamping the pill in place between securing members 1228 and fence 1280.

Figure 12A:
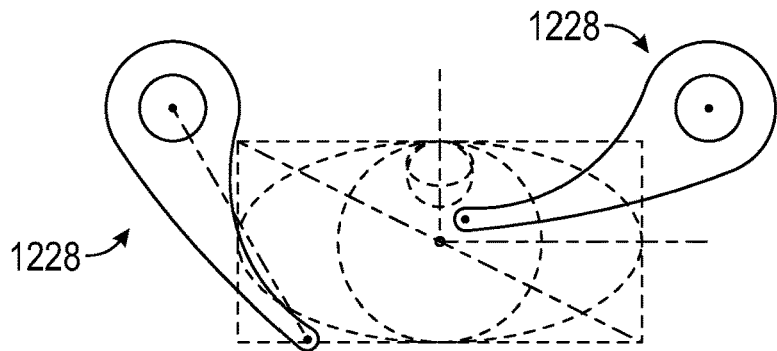
FIGS. 12A-12C illustrate exemplary mechanisms that are adapted to secure a variety of pills having different shapes and sizes.
Figure 12B:
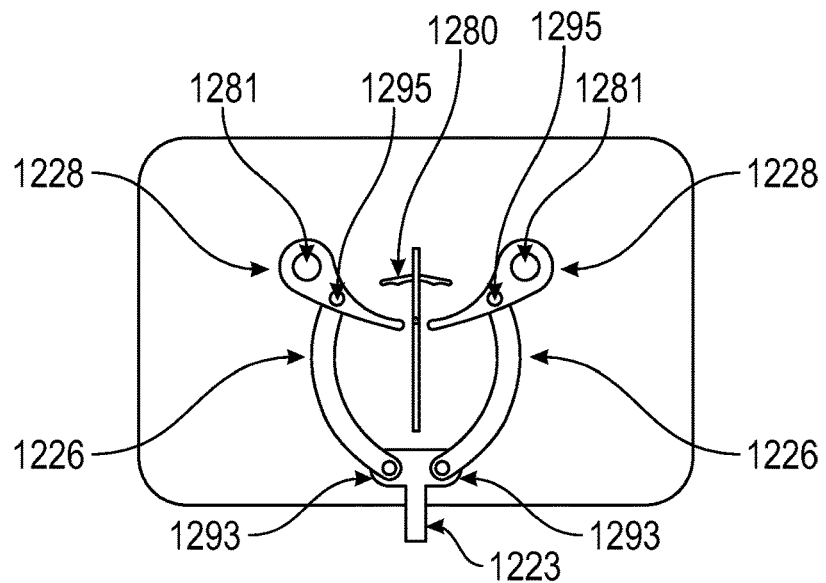
Figure 12C:
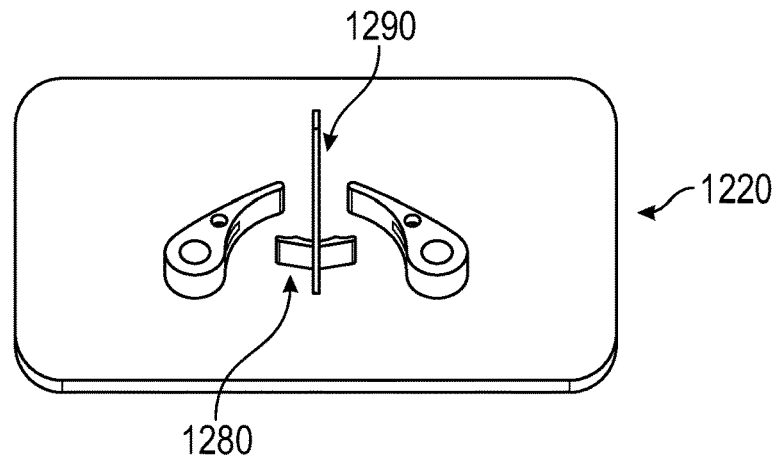

Pill securing members 1228 are adapted to be rotated about pivots 1281, and FIG. 12A illustrates an exemplary range of motion of pill securing members 1228 about pivots 1281. While FIG. 12A shows an exemplary range of motion of the pill securing members, they may generally be symmetrically positioned (including during movement) relative to the path or plane of the blade. FIG. 12A illustrates an exemplary range of motion between the two dashed lines, which allows the pill securing members to be able to secure and grip a wide variety of pill shapes and sizes. The circular and oval dashed lines in FIG. 12A represent exemplary pills and exemplary pill positions, and illustrate how the freedom of movement of the pill securing members allows them to secure a variety of pill shapes and sizes when an operator moves pill adjustment actuator 1223. The pill securing members are adapted to rotate as illustrated in FIG. 12A, and are not adapted to overlap with the blade path or blade plane throughout their range of motion.

This arrangement may also optionally allow the user to position the two securing members in different positions relative to the base and fence by moving the actuator 1223 accordingly. By optionally allowing for individual position control of the different securing members 1228, this arrangement may allow the user to secure and cut pills having a variety of configurations, including those that might require the securing members to be positioned in different positions relative to the base. Additionally, once the pill is secured, additional user actuation of actuator 1223 allows the user to move the pill in a direction other than along a blade plane, such as laterally (descried elsewhere herein), which may allow for cuts to be made other than simply cutting the pill into equally-sized pieces.

Figure 13:
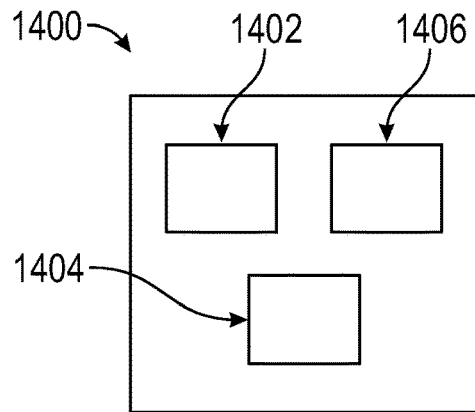
FIG. 13 schematically illustrates some components of an exemplary pill cutter.

FIG. 13 schematically illustrates pill cutter 1400 that optionally includes one or more processors or controllers 1404, one or more computer executable methods 1402 (e.g., software, firmware, algorithms), and electronics 1406. Electronics 1406 may include any hardware, electrical connections and circuitry that are adapted to perform and provide any of the pill cutter functionality herein.

For example, electronics 1406 may include one or more sensors, such as a first sensor that is adapted to sense if the bladed portion is sufficiently closed such that a motor can be safely activated (energized), which is described in more detail herein. Electronics may also include a sensor (optionally a second sensor) that is adapted to sense or determine if a blade or blade arm are displaced by the presence of a pill, which is described in more detail herein. Pill cutter 1400 may incorporate any of the features of any of the pill cutters described herein. Any of the components schematically illustrated may be disposed in either a bladed portion or a base portion, for example.

In some examples, the pill cutters herein may be adapted to determine one or more or if the motor is functioning at an acceptable level or if the blade is in an acceptable state or condition. For example only, pill cutters herein may include a first sensor that is adapted to monitor the speed of a motor, and a second sensor that is adapted to sense the motor current. An output from the first sensor may indicate the motor speed is outside of an acceptable range (e.g., below), which may indicate the motor is not operating optimally, such as if the motor is jammed. An output from the second sensor may indicate that the motor current is outside of an acceptable range (e.g., higher or lower than an acceptable range), which may indicate the blade is worn and needs to be replaced.

Figure 14:
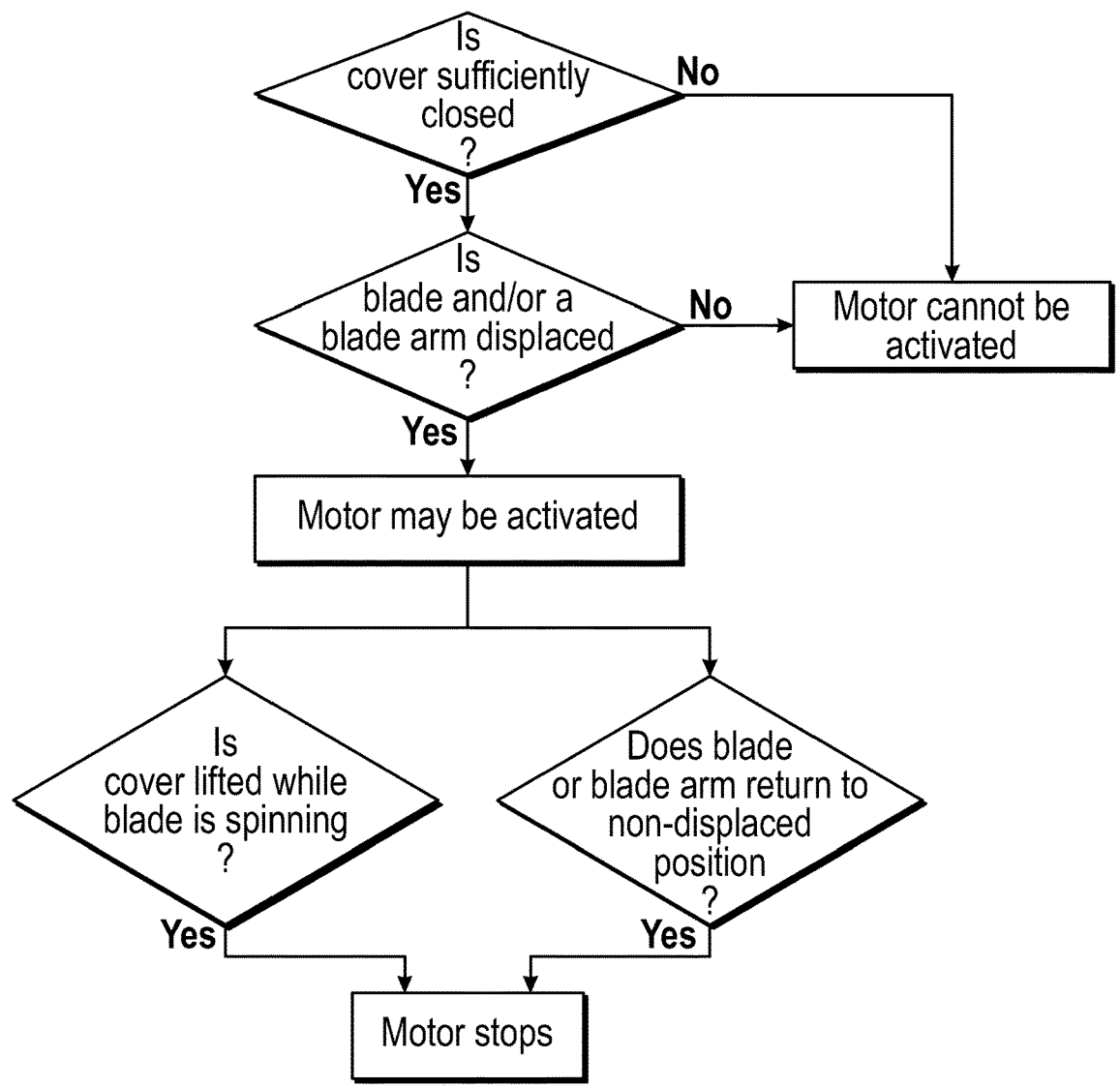
FIG. 14 illustrates an exemplary method that may be incorporated into any of the pill cutters herein.

FIG. 14 illustrates a merely exemplary decision tree and method that may be implemented into one or more computer executable methods, and which is described in more detail herein. FIG. 14 illustrates a merely exemplary method that may be performed in or with any of the pill cutters herein, wherein the pill cutter is adapted to prevent the motor from being activated (or allow the motor to be activated) in certain scenarios, and thus adapted to either prevent or allow the blade to spin in those scenarios. Not all steps in FIG. 14 need to be implemented in the method.

The decision tree shown in the method of FIG. 14 may be modified to illustrate a method that includes sensing one or both of motor speed and motor current, the implementation of which is described in more detail above.

Even if not specifically indicated, one or more techniques described in this disclosure may be implemented, at least in part, in hardware, software, firmware or any combination thereof. For example, various aspects of the techniques or components may be implemented within one or more processors, including one or more microprocessors, digital signal processors (DSPs), application specific integrated circuits (ASICs), field programmable gate arrays (FPGAs), programmable logic circuitry, or the like, either alone or in any suitable combination. The term "processor" or "processing circuitry" may generally refer to any of the foregoing circuitry, alone or in combination with other circuitry, or any other equivalent circuitry.

Such hardware, software, or firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as random access memory (RAM), read only memory (ROM), non-volatile RAM (NVRAM), electrically erasable programmable ROM (EEPROM), Flash memory, and the like. The instructions may be executed by a processor to support one or more aspects of the functionality described in this disclosure.

The pill cutters herein may be used to cut a wide variety of pills, such as medical pills (e.g., prescription, over-the-counter), vitamins, etc.

It is understood that features and functionality described in certain examples or embodiments may be integrated and incorporated into other examples or embodiments unless the disclosure herein indicates to the contrary. Additionally, certain features and functionality herein may be integrated into existing pill splitters without necessarily requiring every feature from an example or embodiment be incorporated. For example, any of the pill cutters herein may include a spinning blade, but in other embodiments or examples, the pill cutter may function without using a spinning blade and may include a blade that is the same or similar to traditional pill splitters with blades that do not spin. Additionally, any of the features herein not specifically related to spinning blade pill cutters may describe features that may be integrated into traditional pill cutters. For example, the disclosure includes examples in which the pill cutters are adapted to control and cause lateral pill movement, which may be integrated into traditional pill splitters.

What is claimed is:

1. A pill cutter, comprising:
   a bladed portion that includes a blade; and
   a base portion including,
      a pill cutting surface sized and configured to receive a pill thereon, and
         a first pill securing member including a first surface, the first pill securing member disposed on a first side of a blade plane and adapted to rotate about a first axis relative to the pill cutting surface and relative to one or more pill support surfaces disposed on the first side and the second side of the blade plane, and
         a second pill securing member including a first surface, the second pill securing member disposed on a second side of the blade plane and adapted to rotate about a second axis relative to the pill cutting surface and relative to the one or more pill support surfaces disposed on the first side and the second side of the blade plane,
      the first and second securing members each having free ends spaced away from the first and second axes, respectively, the first and second pill securing members arranged such that when the first and securing members are each in a closed state and in the absence of a pill, the free ends are directed toward the blade plane,
   the one or more pill support surfaces static relative to the pill cutting surface, and
   the first surfaces of the first and second pill securing members facing the one or more pill support surfaces, the first surfaces of the first and second securing members and the one or more pill support surfaces arranged to apply securing pill forces about the blade plane.

2. The pill cutter of claim 1, wherein the first and second pill securing members are configured and arranged to rotate simultaneously and together relative to the pill cutting surface.

3. The pill cutter of claim 1, wherein the first and second pill securing members each have a first end that are each movable relative to the blade plane when the first and second pill securing members are rotated about the corresponding axis.

4. The pill cutter of claim 1, further comprising an actuator disposed on a first side of the base portion in operable communication with the first and second securing members, the actuator positioned to be moved by a user to cause rotation of the first and second pill securing members about the corresponding axes.

5. The pill cutter of claim 4, wherein the actuator and the first and second pill securing members are in operable communication such that actuation of the actuator causes symmetrical movement of the first and second pill securing members relative to the blade plane.

6. The pill cutter of claim 4, wherein the actuator and the first and second pill securing members are in operable communication such that the first and second pill securing members are configured to be moved non-symmetrically relative to the blade plane.

7. The pill cutter of claim 1, wherein the first and second pill securing members are laterally rotatable relative to the blade plane.

8. The pill cutter of claim 1, wherein the one or more pill support surfaces comprise first and second pill support surfaces separated by a slot.

9. A pill cutter, comprising:
   a bladed portion that includes a blade; and
   a base portion including,
      a pill cutting surface sized and configured to receive a pill thereon,
      a first pill securing member disposed on a first side of a blade plane, the first pill securing member adapted to rotate about a first axis relative to the pill cutting surface,
      a second pill securing member disposed on a second side of the blade plane, the second pill securing member adapted to rotate about a second axis relative to the pill cutting surface,
         the first and second securing members each having ends that are spaced from the corresponding axis and that are directed across the blade plane, the first and second securing members each having an inner surface with a bend formed therein;
      one or more pill support surfaces static relative to the pill cutting surface,
      an actuator in operable communication with the first and second securing members, the actuator positioned such that it is physically accessible for direct contact and movement relative to the pill cutting surface to cause symmetrical movement of the first and second pill securing members about the blade plane,
      the first and second pill securing members facing the one or more pill support surfaces, the first and second pill securing members and the one or more pill support surfaces arranged to apply securing pill forces about the blade plane.

10. The pill cutter of claim 9, wherein the ends are each movable relative to the blade plane when rotated about the corresponding axis.

11. The pill cutter of claim 9, wherein the one or more pill support surfaces comprise a fence including a slot extending upward from the pill cutting surface and positioned to provide a rear support for a pill positioned upon the pill cutting surface and within the blade plane.

12. The pill cutter of claim 9, wherein the first and second pill securing members are biased towards a first configuration such that when the ends of the first and second pill securing members are rotated away from one other in response to an actuation force on the actuator, the ends will automatically revert towards each other upon release of the actuation force.

13. A pill cutter, comprising:
   a bladed portion that includes a blade; and
   a base portion including,
      a pill cutting surface sized and configured to receive a pill thereon, and
      a first pill securing member including a first surface, the first pill securing member disposed on a first side of a blade plane and adapted to rotate about a first axis relative to the pill cutting surface, and
      a second pill securing member including a first surface, the second pill securing member disposed on a second side of the blade plane and adapted to rotate about a second axis relative to the pill cutting surface,
         the first and second securing members each having ends spaced away from the first and second axes, respectively, the first and second pill securing members arranged such that when the first and securing members are each in a closed state and in the absence of a pill, the ends are closer to the blade plane than the corresponding axis, a pill support fence disposed on the first side and the second side of the pill cutting surface and opposing the first surfaces of the first and second pill securing members, the pill support fence static relative to the pill cutting surface, the first surfaces of the first and second pill securing members and the pill support fence arranged to apply securing pill forces about the blade plane.

14. The pill cutter of claim 13, wherein the pill support fence comprises first and second surfaces with a slot therebetween, the first and second surfaces on first and second sides of the blade plane, respectively.

\* \* \* \* \*